(12) United States Patent
Shiraishi

(10) Patent No.: US 10,033,460 B2
(45) Date of Patent: Jul. 24, 2018

(54) RECEIVING DEVICE AND METHOD FOR MONITORING CONTROL INFORMATION

(71) Applicant: FUJITSU LIMITED, Kawasaki-shi, Kanagawa (JP)

(72) Inventor: Takashi Shiraishi, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 15/186,892

(22) Filed: Jun. 20, 2016

(65) Prior Publication Data

US 2017/0019174 A1     Jan. 19, 2017

(30) Foreign Application Priority Data

Jul. 16, 2015   (JP) .................................. 2015-142244

(51) Int. Cl.
*H04B 10/079*   (2013.01)
*H04B 10/077*   (2013.01)

(52) U.S. Cl.
CPC ... *H04B 10/07955* (2013.01); *H04B 10/0775* (2013.01); *H04B 2210/074* (2013.01)

(58) Field of Classification Search
None
See application file for complete search history.

(56) References Cited

U.S. PATENT DOCUMENTS

| | | | |
|---|---|---|---|
| 2009/0193273 A1* | 7/2009 | Kobayashi | G06F 1/26 713/320 |
| 2010/0254704 A1 | 10/2010 | Aoki | |
| 2012/0030380 A1 | 2/2012 | Yanagimachi | |
| 2013/0176499 A1* | 7/2013 | Konishi | H04L 1/20 348/723 |
| 2014/0056595 A1 | 2/2014 | Matsui et al. | |
| 2015/0212135 A1* | 7/2015 | Jin | B60L 11/1809 324/538 |

FOREIGN PATENT DOCUMENTS

| | | |
|---|---|---|
| JP | 2010-263610 | 11/2010 |
| JP | 2010-273072 | 12/2010 |
| JP | 2011-77795 | 4/2011 |
| JP | 2014-45370 | 3/2014 |
| JP | WO2016075778 A1 * | 5/2016 |
| WO | WO 2010/123143 A1 | 10/2010 |

* cited by examiner

*Primary Examiner* — Tesfaldet Bocure
(74) *Attorney, Agent, or Firm* — Staas & Halsey LLP

(57) ABSTRACT

There is provided a receiving device including a receiver configured to receive a signal including at least data information and control information; a monitor configured to monitor the control information included in the signal received by the receiver; and a controller configured to control the monitor to start monitoring the control information when a strength of the signal is equal to or lower than a predetermined value.

8 Claims, 18 Drawing Sheets

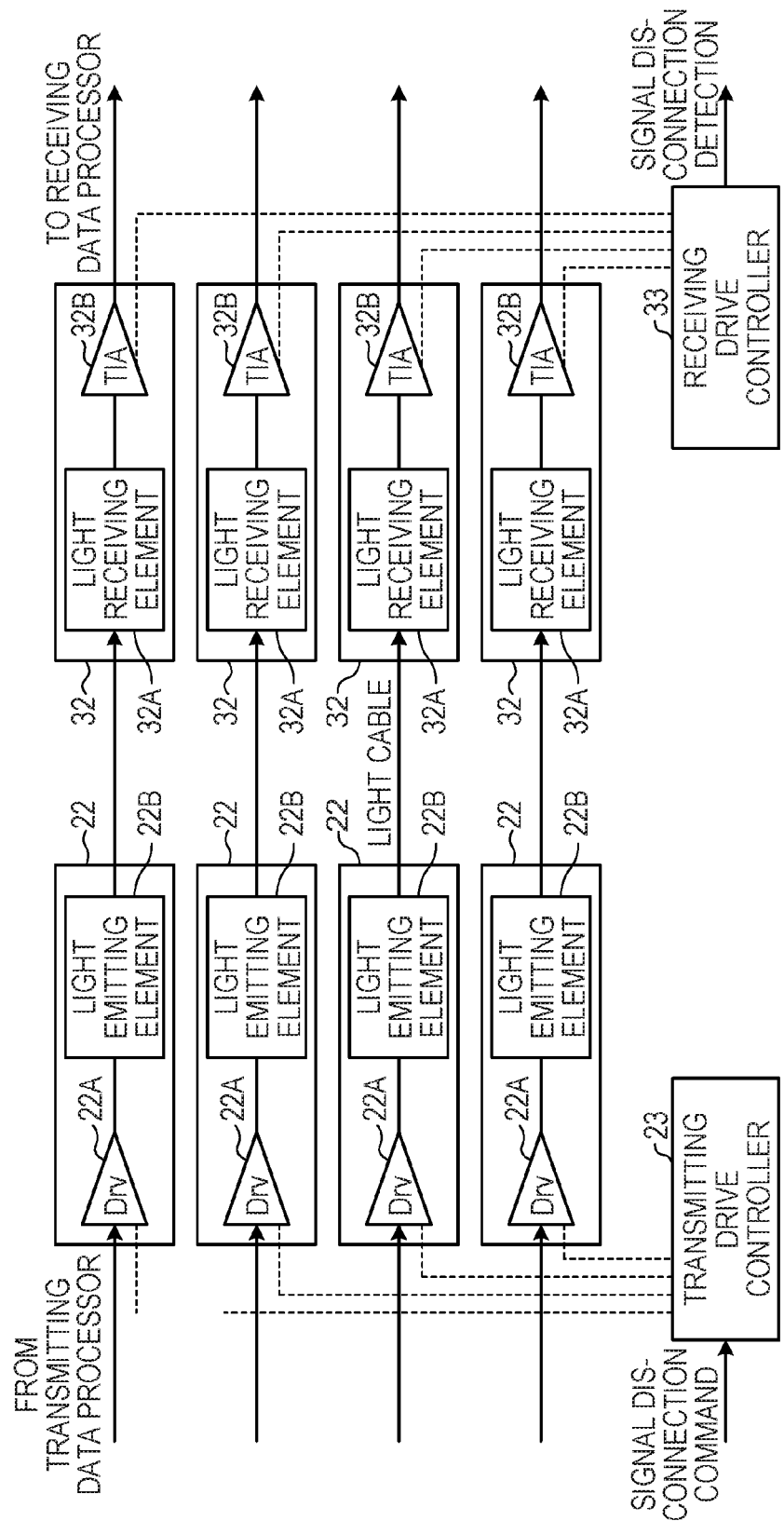

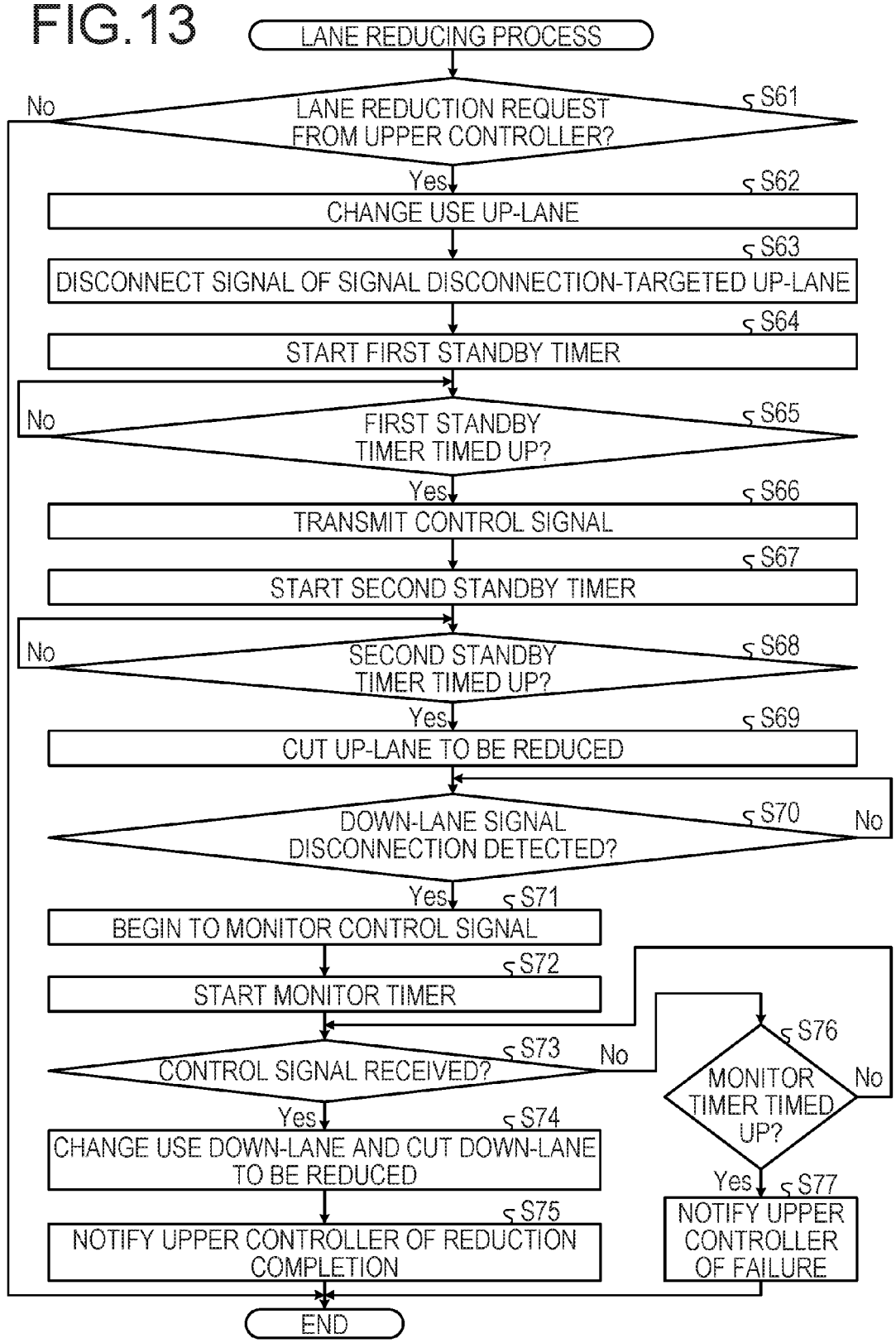

RECEIVING DEVICE AND METHOD FOR MONITORING CONTROL INFORMATION

CROSS-REFERENCE TO RELATED APPLICATION

This application is based upon and claims the benefit of priority of the prior Japanese Patent Application No. 2015-142244, filed on Jul. 16, 2015, the entire contents of which are incorporated herein by reference.

FIELD

The embodiments discussed herein are related to a receiving device and a method for monitoring control information.

BACKGROUND

In recent years, for example, in the fields of data centers, high-end computers (HPC) and so on, a transmission capacity and a transmission distance required for a communication band that is used are being increased. However, in the high-speed transmission using conventional electrical signal transmission systems, since the transmission distance and the transmission capacity have a trade-off relationship, the introduction of optical signal transmission systems is being progressed.

For example, in the communication standards such as Ethernet® and Infiniband, the standardization of systems using an optical transceiver of a multi-lane such as a 10 Gbps×4 lane, a 10 Gbps×12 lane or a 25 Gbps×4 lane is being progressed. For example, when the maximum amount of traffic is 100 Gbps, an optical transmission device is designed to use an optical transceiver of a 25 Gbps×4 lane. However, if actual network utilization efficiency is deteriorated, unnecessary power is wastefully consumed. Therefore, the wasteful power consumption may be reduced by adjusting the number of lanes used, for example, by reducing the number of lanes unused, depending on the actual amount of traffic. At this time, by transmitting use lane information, such as the number of lanes used, as control information between optical transmission devices, it is possible to adjust the number of lanes used, depending on the actual network utilization efficiency.

References listed below disclose techniques for transmitting control information between optical transmitters. Japanese Laid-Open Patent Publication No. 2014-045370 discloses a method for transmitting control information carried on a digital signal which is an ON/OFF optical main signal. An optical transmitter transmits the ON/OFF optical main signal carrying control information such as use lane information, to an opposing optical transmitter. The opposing optical transmitter may use a loss of signal (LOS) function that detects signal disconnection to detect the control information from the ON/OFF main signal.

Japanese Patent No. 5351689 discloses a method for transmitting a control frame of control information such as, for example, an operation administration and maintenance (OAM) frame, to be inserted between data frames. That is, an optical transmitter may transmit the control information at the same bit rate as data. Japanese Laid-Open Patent Publication No. 2010-263610 discloses a method for transmitting control information added with a header in order to distinguish between transmission frame data and the control information.

Related techniques are disclosed in, for example, Japanese Laid-Open Patent Publication No. 2014-045370, Japanese Laid-Open Patent Publication No. 2010-263610.

SUMMARY

According to an aspect of the invention, a receiving device includes: a receiver configured to receive a signal including at least data information and control information; a monitor configured to monitor the control information included in the signal received by the receiver; and a controller configured to control the monitor to start monitoring the control information when a strength of the signal is equal to or lower than a predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory view illustrating one example of an optical transmitter and an optical receiver;

FIG. 13 is a flow chart illustrating one example of a processing operation of a first controller in a first transmitting device regarding a lane reducing process;

DESCRIPTION OF EMBODIMENTS

In the method disclosed in Japanese Laid-Open Patent Publication No. 2014-045370, since the frequency where the optical main signal becomes OFF is increased with an increase in the frequency of transmission of the control information, the time for which the main signal (data) cannot be transmitted is extended. In the method disclosed in Japanese Patent No. 5351689, since there is a need to monitor the control frame from the opposing optical transmitter at all times, a reception side processing load is increased. In the method disclosed in Japanese Laid-Open Patent Publication No. 2010-263610, since the control information is identified based on a header, a wasteful latency occurs when the opposing optical transmitter decodes the control information. That is, there are increasing loads of reception of the control information at the reception side and addition of the header at the transmission side.

Hereinafter, embodiments of a receiving device and a method for monitoring control information, which are capable of reducing a processing load when control information is monitored, will be described in detail with reference to the drawings. The spirit and scope of the invention are not limited by the disclosed embodiments. The following embodiments may be appropriately combined with each other unless contradictory.

First Embodiment

Figure 1:
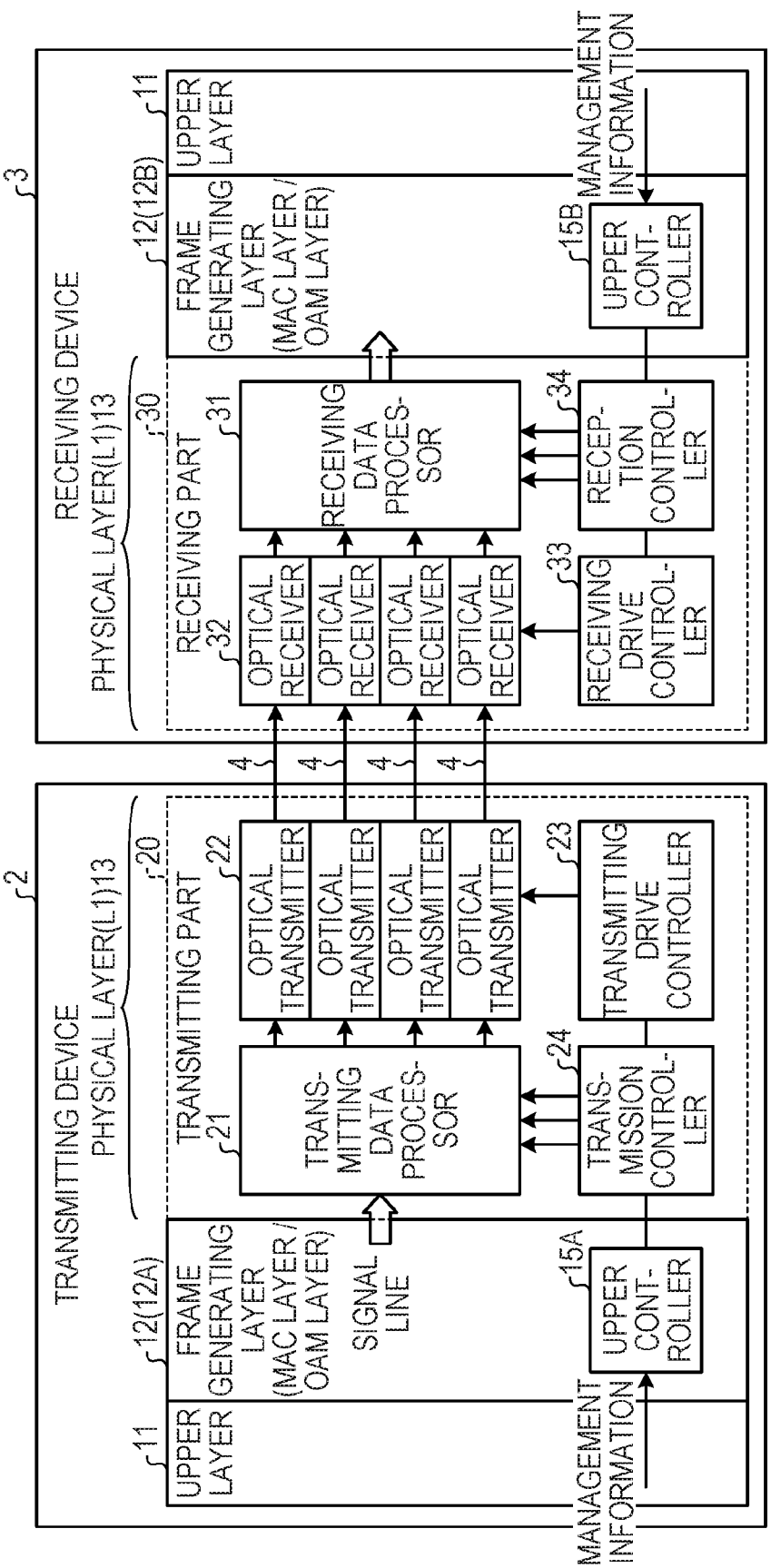
FIG. 1 is an explanatory view illustrating one example of an optical transmission system according to a first embodiment.

FIG. 1 is an explanatory view illustrating one example of an optical transmission system 1 according to a first embodiment. Referring to FIG. 1, an optical transmission system 1 includes a transmitting device 2, a receiving device 3 at an opposing side, and an optical cable 4 interconnecting the transmitting device 2 and the receiving device 3. The transmitting device 2 and the receiving device 3 are optical multi-lane transmission devices such as, for example, optical modules. The transmitting device 2 uses a plurality of lanes within the optical cable 4 to transmit an optical signal to the receiving device 3. Meanwhile, FIG. 1 represents four lanes, but the number of lanes may be appropriately changed.

The transmitting device 2 may be divided into an upper layer 11, a frame generating layer 12 and a physical layer 13 according to processing functions performed by the layers. The upper layer 11 corresponds to software and performs, for example, traffic management and frame transmission information management. The frame generating layer 12 includes, for example, an MAC layer which performs generation and decoding of MAC frames, discrimination of frame types, and control of frame transmission, and an OAM layer which performs generation and decoding of OAM frames for maintenance. The frame generating layer 12 further includes an upper controller 15A. The physical layer 13 corresponds to a layer 1 (L1) and includes a transmitting part 20 connected to the optical cable 4. The transmitting part 20 includes a transmitting data processor 21, a plurality of optical transmitters 22, a transmitting drive controller 23, and a transmission controller 24. The transmitting data processor 21 is a processor which performs various transmission processes such as, for example, a coding process for data signals. Each optical transmitter 22 coverts a signal obtained from the transmitting data processor 21 into an optical signal and transmits the optical signal to the optical cable 4. Meanwhile, it is assumed that the optical transmitter 22 is provided for each of usable lanes in the optical cable 4. The usable lanes correspond to both of an active lane and an inactive lane in the optical cable 4. The active lane corresponds to a lane that is being used which is being driven between the transmitting device 2 and the receiving device 3. The inactive lane corresponds to a lane that is unused which is not being driven between the transmitting device 2 and the receiving device 3. The transmitting drive controller 23 drives and controls each optical transmitter 22. The transmission controller 24 controls the entire transmitting part 20.

The receiving device 3 may be divided into an upper layer 11, a frame generating layer 12, and a physical layer 13. The frame generating layer 12 in the receiving device 3 includes an upper controller 15B. The physical layer 13 includes a receiving part 30 connected to the optical cable 4. The receiving part 30 includes a receiving data processor 31, a plurality of optical receivers 32, a receiving drive controller 33, and a reception controller 34. Each optical receiver 32 converts an optical signal from the optical cable 4 into an electrical signal. In addition, it is assumed that the optical receiver 32 is provided for each of usable lanes in the optical cable 4. The receiving data processor 31 is a processor which performs various reception processes such as, for example, a decoding process for signals from the optical receiver 32. The receiving drive controller 33 drives and controls each optical receiver 32. The reception controller 34 controls the entire receiving part 30.

Figure 2:
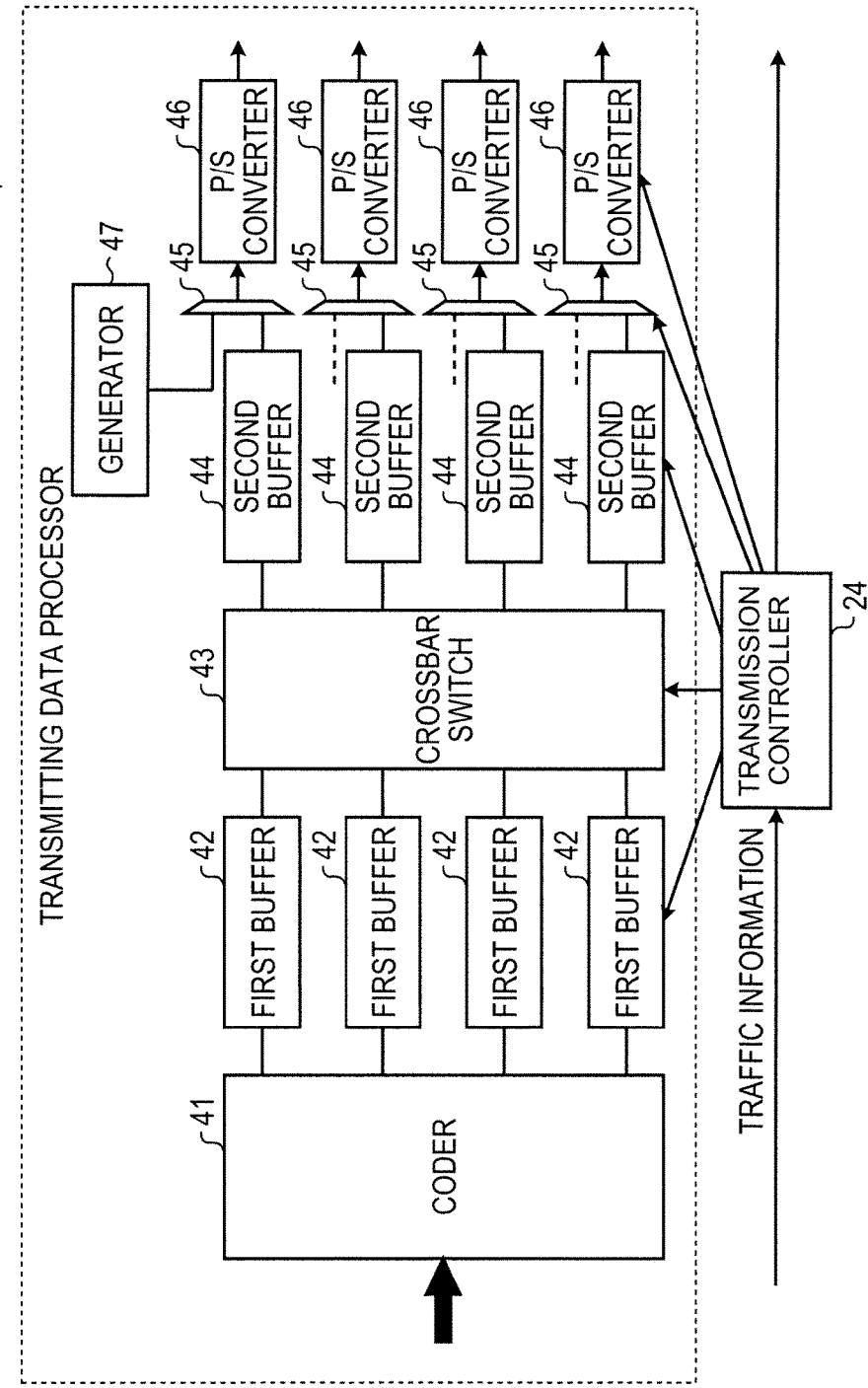
FIG. 2 is an explanatory view illustrating one example of a transmitting data processor.

FIG. 2 is an explanatory view illustrating one example of the transmitting data processor 21. Referring to FIG. 2, the transmitting data processor 21 includes a coder 41, a plurality of first buffers 42, a crossbar switch 43, a plurality of second buffers 44, a plurality of input selectors 45, a plurality of parallel/serial (P/S) converters 46, and a generator 47. In addition, it is assumed that each second buffer 44, each input selector 45, and each P/S converter 46 are provided for each of usable lanes in the optical cable 4.

The coder 41 codes a data signal, divides the coded data signal, and outputs each of the divided data signals to the first buffer 42. The first buffer 42 has an area storing the data signals divided by the coder 41. The crossbar switch 43 is a switch which switches and outputs the data signals stored in the first buffer 42 to the second buffer 44 corresponding to the lane. The crossbar switch 43 is a switch which switches use lanes of the transmitting device 2 side to adjust the number of use lanes. The second buffer 44 has an area storing the data signals switched and output from the crossbar switch 43. The P/S converter 46 is connected to the lanes in the optical cable 4, serializes the divided data signals stored in the second buffer 44, and outputs the serialized data signals to the optical transmitter 22. The generator 47 generates a control signal. Meanwhile, the control signal is control information including use lane information indicating, for example, addition or reduction of use lanes. The reduction of use lanes is an instruction to decrease the number of lanes in use. The addition of use lanes is an instruction to increase the number of lanes in use. The input selector 45 is a switch which switches and selects an input of the P/S converter 46 to the second buffer 44 or the generator 47. The input selector 45 interconnects the second buffer 44 and the P/S converter 46 in data communication.

The input selector 45 interconnects the generator 47 and the P/S converter 46 in control signal transmission.

The transmission controller 24 controls the first buffer 42, the crossbar switch 43, the second buffer 44, the input selector 45, and the P/S converter 46. The transmission controller 24 controls the first buffer 42, the crossbar switch 43, the second buffer 44, the input selector 45, and the P/S converter 46, for example, according to a lane addition request or a lane reduction request from the upper controller 15A. The upper controller 15A notifies the transmission controller 24 of the lane addition request or the lane reduction request to adjust the number of use lanes based on an amount of traffic in the optical transmission system 1.

Figure 3:
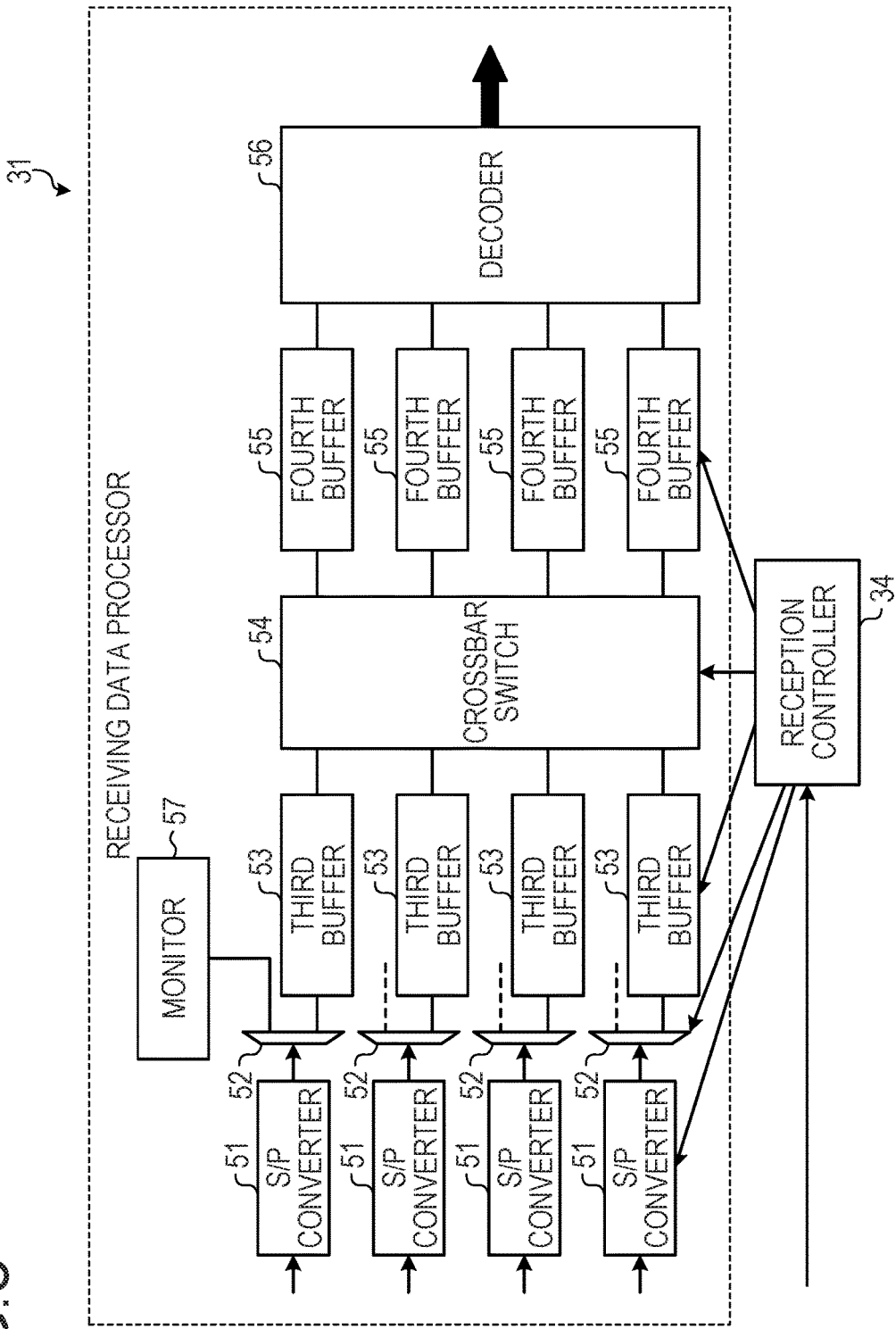
FIG. 3 is an explanatory view illustrating one example of a receiving data processor.

FIG. 3 is an explanatory view illustrating one example of the receiving data processor 31. Referring to FIG. 3, the receiving data processor 31 includes a plurality of S/P (Serial/Parallel) converters 51, a plurality of output selectors 52, a plurality of third buffers 53, a crossbar switch 54, a plurality of fourth buffers 55, a decoder 56, and a monitor 57. In addition, it is assumed that each S/P converter 51, each output selector 52, and each third buffer 53 are provided for each of usable lanes in the optical cable 4.

The S/P converter 51 parallelizes a signal from the optical receiver 32 connected thereto. The output selector 52 is a switch which switches and selects an output of the S/P converter 51 to the third buffer 53 or the monitor 57. The output selector 52 interconnects the S/P converter 51 and the third buffer 53 in data communication. The output selector 52 interconnects the S/P converter 51 and the monitor 57 at the time of detection of signal disconnection. The third buffer 53 has an area storing data signals in the parallelized signal. The crossbar switch 54 switches and outputs the data signals stored in the third buffer 53 to the fourth buffer 55. The crossbar switch 54 is a switch which switches use lanes of the receiving device 3 side to adjust the number of use lanes. The fourth buffer 55 has an area storing the parallelized data signals. The decoder 56 decodes the data signals stored in the fourth buffer 55, synthesizes the decoded data signals, and outputs the synthesized signals.

The reception controller 34 is, for example, a controller that controls the S/P converter 51, the output selector 52, the third buffer 53, the crossbar switch 54, and the fourth buffer 55. Upon detecting signal disconnection of a lane through the optical receiver 32, the reception controller 34 switches the output selector 52 corresponding to the lane of the signal disconnection to the monitor 57. The monitor 57 is, for example, a monitor which begins to monitor a control signal from the transmitting device 2 of the signal disconnection lane. That is, the reception controller 34 switches and connects the S/P converter 51 of the signal disconnection lane and the monitor 57 at a timing when the signal disconnection of the lane is detected, and causes the monitor 57 to begin to monitor a control signal of the signal disconnection lane.

FIG. 4 is an explanatory view illustrating one example of the optical transmitter 22 and the optical receiver 32. The optical transmitter 22 illustrated in FIG. 4 includes a plurality of drivers 22A and a plurality of light emitting elements 22B. It is assumed that each driver 22A and each light emitting element 22B are provided for each usable lane in the optical cable 4. The driver 22A drives and controls the light emitting element 22B. The light emitting element 22B outputs an optical signal according to the drive control of the driver 22A. The transmitting drive controller 23 controls the driver 22A to adjust the signal strength of the optical signal output from the light emitting element 22B. Upon detecting a signal disconnection request from the transmission controller 24, the transmitting drive controller 23 controls the driver 22A to disconnect the optical signal output from the light emitting element 22B. As a result, the light emitting element 22B disconnects an output signal.

The optical receiver 32 includes a plurality of light receiving elements 32A and a plurality of trans-impedance amplifiers (TIA) 32B. It is assumed that each light receiving element 32A and each TIA 32B are provided for each usable lane in the optical cable 4. The light receiving element 32A is connected to the optical cable 4 and converts an optical signal from a lane into an electrical signal. The TIA 32$b$ converts the electrical signal from the light receiving element 32A into a voltage signal and outputs the voltage signal to the receiving data processor 31. The receiving drive controller 33 drives and controls the TIA 32B, monitors a voltage value of the TIA 32B, and detects signal disconnection based on the monitoring result. The receiving drive controller 33 is, for example, a controller which monitors whether or not the voltage value (signal strength) of the TIA 32B is equal to or lower than a predetermined threshold, and determines that a signal is disconnected when the voltage value is equal to or lower than the predetermined threshold. The receiving drive controller 33 notifies the reception controller 34 of a result of the determination of the TIA 32B. The reception controller 34 identifies signal disconnection of each lane based on the result of the determination of the TIA 32B.

Figure 5A:
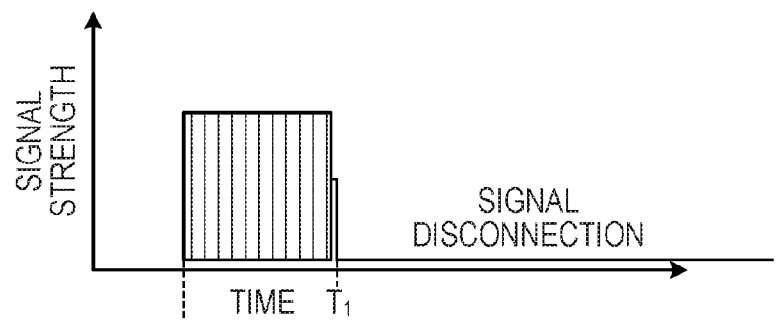
FIGS. 5A and 5B are an explanatory view illustrating one example of a relationship between a signal output state and a signal disconnection detection state in a lane failure.
Figure 5B:
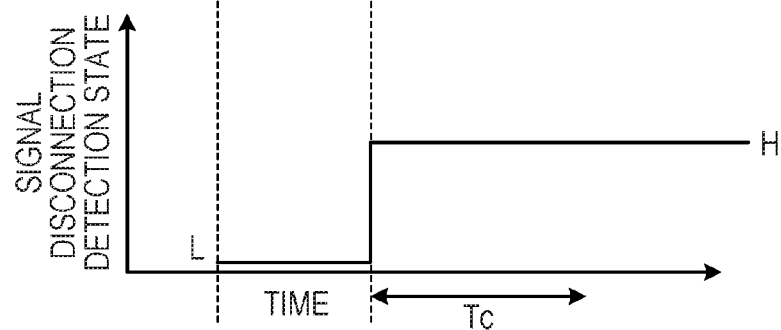

FIG. 5 is an explanatory view illustrating one example of a relationship between a signal output state and a signal disconnection detection state in a lane failure. FIG. 5A illustrates an output state of a signal of a lane of the optical transmitter 22, and FIG. 5B illustrates a detection state of signal disconnection of the reception controller 34.

The reception controller 34 brings the detection state of signal disconnection into a high level (H), as illustrated in FIG. 5B, at a detection timing T1 of signal disconnection when a signal voltage value (signal strength) illustrated in FIG. 5A is equal to or lower than a predetermined threshold. The monitor 57 starts up a monitor timer at the detection timing T1 of signal disconnection and determines whether or not timer time Tc of the monitor timer is timed up. When the monitor 57 continues to detect the signal disconnection until the timer time Tc is timed up, the reception controller 34 determines that a lane has a failure of signal disconnection.

Figure 6A:
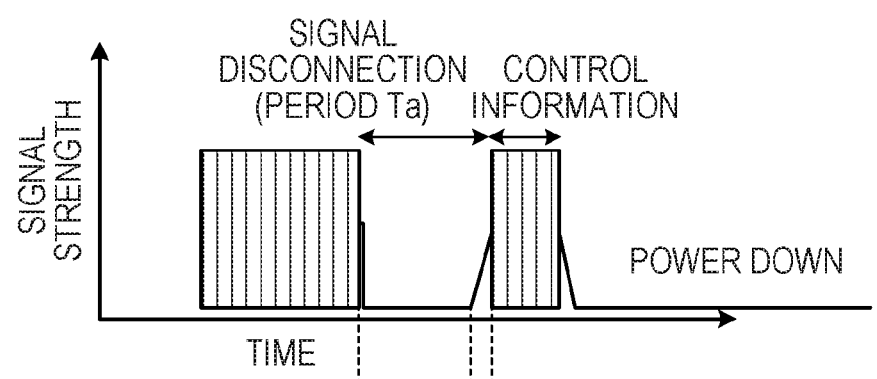
FIGS. 6A and 6B are an explanatory view illustrating one example of a relationship between a signal output state and a signal disconnection detection state in a control signal monitoring.
Figure 6B:
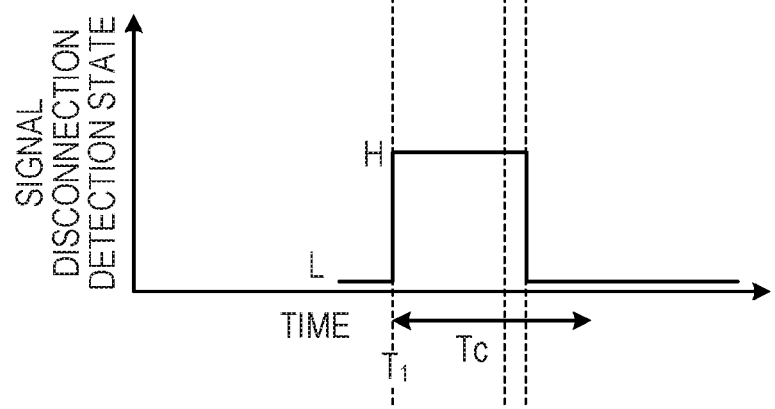

FIG. 6 is an explanatory view illustrating one example of a relationship between a signal output state and a signal disconnection detection state in control signal monitoring. FIG. 6A illustrates an output state of a signal of a lane of the optical transmitter 22, and FIG. 6B illustrates a detection state of signal disconnection of the reception controller 34.

Upon detecting a lane reduction request or a lane addition request from the upper controller 15A, the transmission controller 24 disconnects a signal, as illustrated in FIG. 6A. When the signal is disconnected, the transmission controller 24 starts timer time Ta of a first standby timer. Then, the transmission controller 24 begins to transmit a control signal when the first standby timer is timed up. In addition, the transmission controller 24 starts timer time Tb of a second standby timer from the beginning of transmission of the control signal. The reception controller 34 brings the detection state of signal disconnection into a high level (H) depending on a detection timing T1 of signal disconnection. In addition, the reception controller 34 switches the output selector 52 of a lane of signal disconnection to the monitor 57 at the detection timing T1 of signal disconnection, starts the timer time Tc of the monitor timer of the monitor 57, and determines whether or not the timer time Tc is timed up. The monitor 57 monitors the control signal until the timer time Tc is timed up. The timer time Tc corresponds to time for which the transmitting device 2 begins to transmit the control signal from the signal disconnection and the receiving device 3 can sufficiently receive the control signal.

The reception controller 34 begins to monitor the control signal at the detection timing T1 of signal disconnection through the monitor 57. That is, since there is no need for the reception controller 34 to monitor the control signal at all times, a processing load required for the monitoring can be reduced. In addition, even when no header is added to the control signal, the reception controller 34 may recognize a signal received within the timer time Tc as a control signal. In addition, when the control signal cannot be received even after the timer time Tc elapses, the reception controller 34 determines that there occurs a lane failure.

Figure 7:
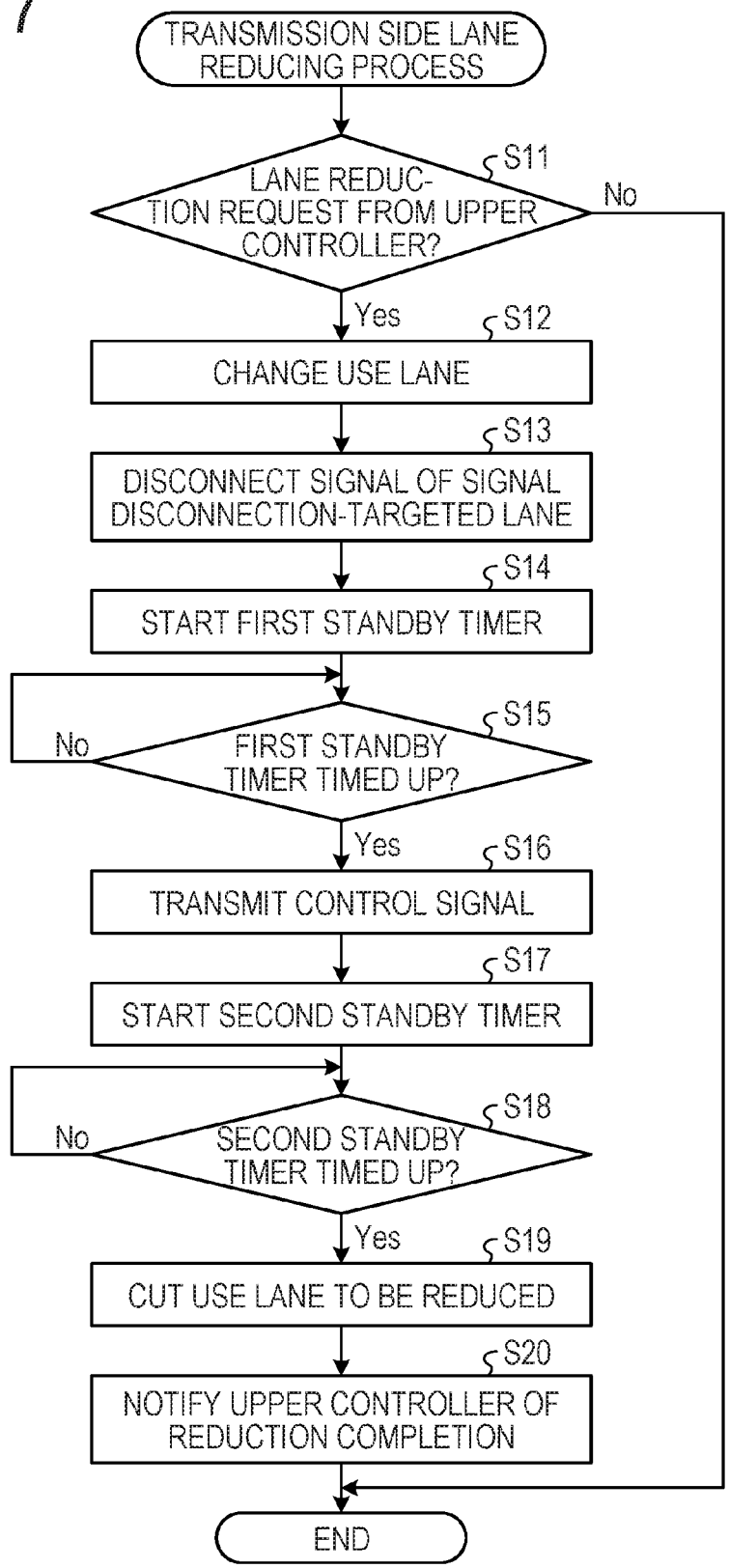
FIG. 7 is a flow chart illustrating one example of a processing operation of a transmission controller regarding a lane reducing process of a transmission side.

Next, the operation of the optical transmission system 1 of the first embodiment will be described. FIG. 7 is a flow chart illustrating one example of a transmission side lane reducing process of the transmission controller 24. Referring to FIG. 7, the transmission controller 24 determines whether or not a lane reduction request from the upper controller 15A is detected (Operation S11). Meanwhile, it is assumed that the lane reduction request includes a number identifying a use lane and a use lane to be reduced. When it is determined that the lane reduction request is detected (Yes in Operation S11), the transmission controller 24 changes the use lane based on the lane reduction request (Operation S12). The transmission controller 24 disconnects a signal disconnection-targeted lane among the use lanes (Operation S13). The lane signal disconnection is made when an output signal of the optical transmitter 22 corresponding to a lane is at a predetermined threshold or less (for example, OFF) in terms of a voltage. As a result, since the receiving device 3 is monitoring the signal state of each use lane, the receiving device 3 can detect signal disconnection of a signal disconnection-targeted lane.

After the signal disconnection of the signal disconnection-targeted lane, the transmission controller 24 starts the first standby timer (Operation S14) and determines whether or not the first standby timer is timed up (Operation S15). It is assumed that the first standby timer sets time for which the signal disconnection is detected in the receiving device 3 from the beginning of the signal disconnection, as the timer time Ta.

When it is determined that the first standby timer is timed up (Yes in Operation S15), the transmission controller 24 transmits the control signal to the signal disconnection lane (Operation S16). In addition, the transmission controller 24 controls the input selector 45 to interconnect the optical transmitter 22 of the signal disconnection lane and the generator 47. The generator 47 generates a control signal including a number identifying a use lane related to a lane reduction request and a use lane to be reduced.

After transmitting the control signal, the transmission controller 24 starts the second standby timer (Operation S17) and determines whether or not the second standby timer is timed up (Operation S18). It is assumed that the second standby timer sets time for which the control signal is received in the receiving device 3 from the beginning of the control signal transmission, as the timer time Tb.

When it is determined that the second standby timer is timed up (Yes in Operation S18), the transmission controller 24 controls the crossbar switch 43 to cut the use lane that is to be reduced (Operation S19). The cutting of the use lane to be reduced refers to making an active reduction-targeted lane to be inactive. The transmission controller 24 notifies the upper controller 15A of reduction completion (Operation S20) and ends the processing operation illustrated in FIG. 7.

When it is determined that the lane reduction request is not detected (No in Operation S11), the transmission controller 24 ends the processing operation illustrated in FIG. 7. When it is determined that the first standby timer is not timed up (No in Operation S15), the transmission controller 24 proceeds to Operation S15 to determine whether or not the first standby timer is timed up. When it is determined that the second standby timer is not timed up (No in Operation S18), the transmission controller 24 proceeds to Operation S18 to determine whether or not the second standby timer is timed up.

The transmitting device 2 disconnects the signal of the optical transmitter 22 corresponding to the use lane according to the lane reduction request and transmits the control signal related to the lane reduction request to the receiving device 3 after the time-up of the first standby timer. After transmitting the control signal, the transmitting device 2 cuts the reduction-targeted lane after the time-up of the second standby timer. As a result, the transmitting device 2 can notify the receiving device 3 of the reduction-targeted lane with the control signal and cut the reduction-targeted lane. In addition, the transmitting device 2 can reduce a processing load required for the control signal transmission.

Figure 8:
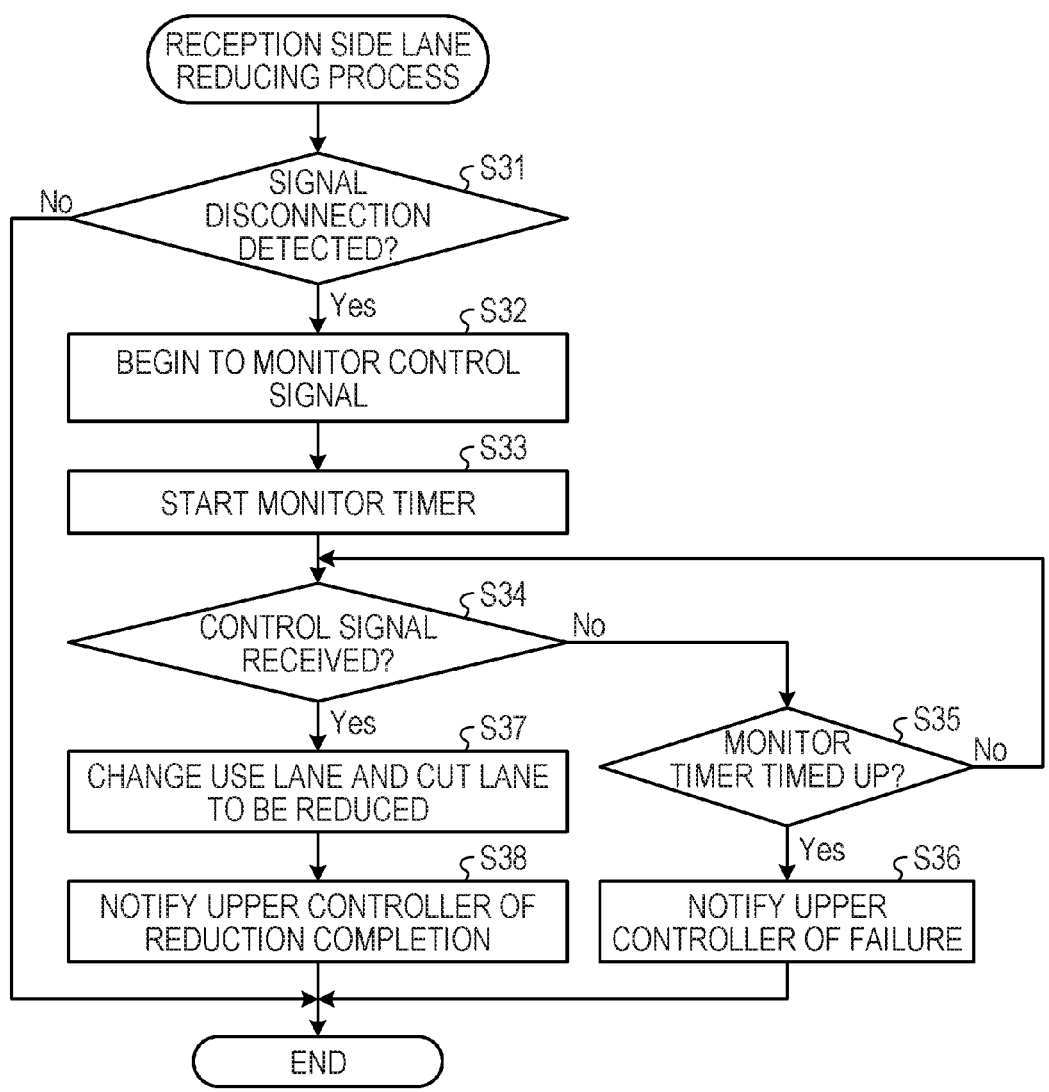
FIG. 8 is a flow chart illustrating one example of a processing operation of a reception controller regarding a lane reducing process of a reception side.

FIG. 8 is a flow chart illustrating one example of a reception side lane reducing process of the reception controller 34. Referring to FIG. 8, the reception controller 34 determines whether or not signal disconnection of a use lane is detected (Operation S31). The reception controller 34 monitors a use lane reception state and determines that the signal of the use lane is disconnected when the strength of the signal is equal to or lower than a predetermined threshold. When it is determined that the use lane signal disconnection is detected (Yes in Operation S31), the reception controller 34 begins to monitor the control signal from the transmitting device 2 through the monitor 57 (Operation S32). That is, the reception controller 34 switches the output selector 52 corresponding to the lane of signal disconnection to the monitor 57 and begins to monitor the control signal through the monitor 57.

After beginning to monitor the control signal through the monitor 57, the reception controller 34 starts the monitor timer (Operation S33) and determines whether or not the control signal is received (Operation S34). When it is determined that the control signal is not received (No in Operation S34), the reception controller 34 determines whether or not the monitor timer is timed up (Operation S35). When it is determined that the monitor timer is timed up (Yes in Operation S35), the reception controller 34 determines that the signal disconnection lane of the transmitting device 2 has a failure, notifies the upper controller 15B of the failure (Operation S36), and ends the processing operation illustrated in FIG. 8.

When it is determined that the monitor timer is not timed up (No in Operation S35), the reception controller 34 proceeds to Operation S34 to determine whether or not the control signal is received. When it is determined that the control signal is received (Yes in Operation S34), the reception controller 34 controls the crossbar switch 54 to change the use lane and cut the reduction-targeted lane (Operation S37). Then, the reception controller 34 notifies the upper controller 15B of the reduction completion (Operation S38) and ends the processing operation illustrated in FIG. 8. When it is determined that the use lane signal disconnection is not detected (No in Operation S31), the reception controller 34 ends the processing operation illustrated in FIG. 8.

The receiving device 3 performing the reception side lane reducing process begins to monitor the control signal through monitor 57 after detecting the signal disconnection. As a result, the receiving device 3 needs not monitor the control signal at all times and can monitor the control signal efficiently, thereby reducing the processing load and power consumption.

After beginning to monitor the control signal related to the lane reduction request, the receiving device 3 determines whether or not the control signal is received within the timer time. When it is determined that the control signal is received within the timer time Tc, the receiving device 3 cuts the use lane based on the control signal. As a result, the receiving device 3 can reduce the number of use lanes based on the control signal.

When it is determined that the control signal is not received within the timer time Tc, the receiving device 3 determines that the signal lane has a failure. As a result, the receiving device 3 can recognize the failure of the signal lane.

Figure 9:
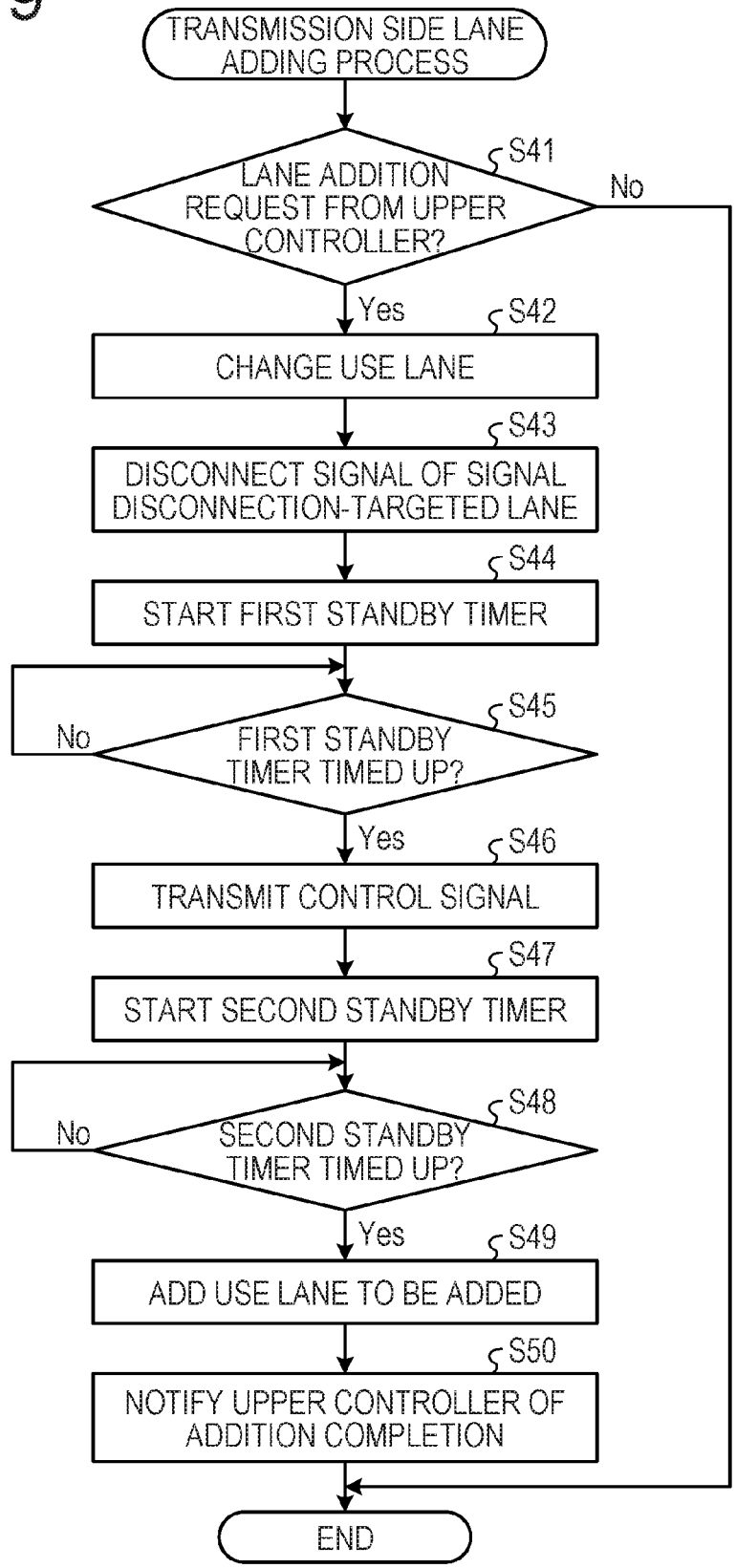
FIG. 9 is a flow chart illustrating one example of a processing operation of the transmission controller regarding a lane adding process of a transmission side.

FIG. 9 is a flow chart illustrating one example of a transmission side lane adding process of the transmission controller 24. Referring to FIG. 9, the transmission controller 24 determines whether or not a lane addition request is detected from the upper controller 15A (Operation S41). It is assumed that the lane addition request includes a number identifying a use lane and a use lane to be added. When it is determined that the lane addition request is detected (Yes in Operation S41), the transmission controller 24 changes the use lane based on the lane addition request (Operation S42). The transmission controller 24 disconnects a signal disconnection-targeted lane among the use lanes (Operation S43). As a result, since the receiving device 3 monitors a signal state of each use lane, a signal disconnection of a signal disconnection-targeted lane can be detected.

After the lane signal disconnection of the signal disconnection-targeted lane, the transmission controller 24 starts the first standby timer (Operation S44) and determines whether or not the first standby timer is timed up (Operation S45). When it is determined that the first standby timer is timed up (Yes in Operation S45), the transmission controller 24 transmits the control signal to the signal disconnection-targeted lane (Operation S46). In addition, the transmission controller 24 controls the input selector 45 to interconnect the optical transmitter 22 of the signal disconnection-targeted lane and the generator 47. The generator 47 generates a control signal including a number identifying a use lane related to a lane addition request and a use lane to be added.

After transmitting the control signal, the transmission controller 24 starts the second standby timer (Operation S47) and determines whether or not the second standby timer is timed up (Operation S48). When it is determined that the second standby timer is timed up (Yes in Operation S48), the transmission controller 24 controls the crossbar switch 43 to add the use lane to be added (Operation S49). The addition of the use lane to be added refers to making an inactive unused lane to be active. The transmission controller 24 notifies the upper controller 15A of addition completion (Operation S50) and ends the processing operation illustrated in FIG. 9.

When it is determined that the lane addition request is not detected (No in Operation S41), the transmission controller 24 ends the processing operation illustrated in FIG. 9. When it is determined that the first standby timer is not timed up (No in Operation S45), the transmission controller 24 proceeds to Operation S45 to determine whether or not the first standby timer is timed up. When it is determined that the second standby timer is not timed up (No in Operation S48), the transmission controller 24 proceeds to Operation S48 to determine whether or not the second standby timer is timed up.

The transmitting device 2 performing the transmission side lane adding process disconnects a signal of the optical transmitter 22 corresponding to the use lane according to the lane addition request and transmits the control signal related to the lane addition request to the receiving device 3 after the time-up of the first standby timer. After transmitting the control signal, the transmitting device 2 adds the addition-targeted lane after the time-up of the second standby timer. As a result, the transmitting device 2 can notify the receiving device 3 of the addition-targeted lane with the control signal and add the addition-targeted lane. In addition, the transmitting device 2 can reduce a processing load required for the control signal transmission.

Figure 10:
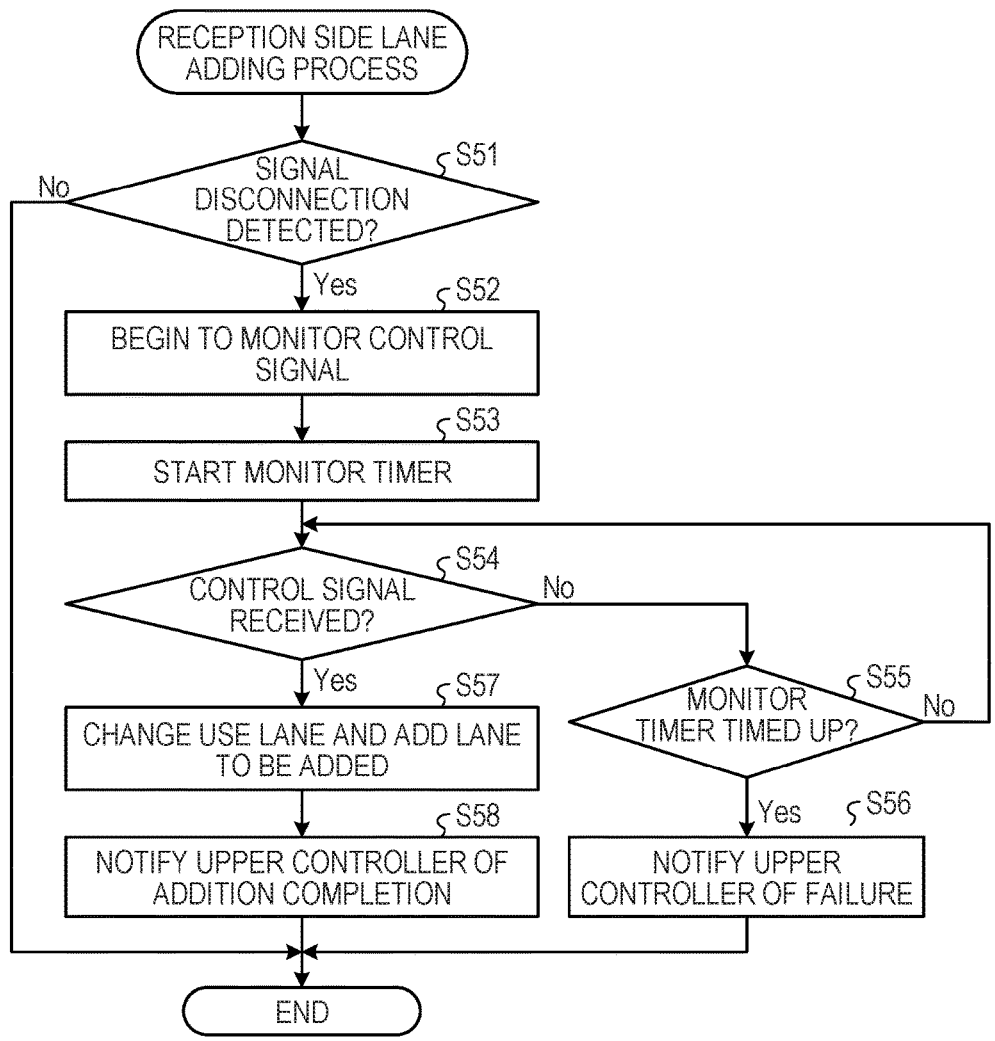
FIG. 10 is a flow chart illustrating one example of a processing operation the reception controller regarding a lane adding process of a reception side.

FIG. 10 is a flow chart illustrating one example of a reception side lane adding process of the reception controller 34. Referring to FIG. 10, the reception controller 34 determines whether or not signal disconnection of a use lane is detected (Operation S51). When it is determined that the use lane signal disconnection is detected (Yes in Operation S51), the reception controller 34 begins to monitor the control signal from the transmitting device 2 through the monitor 57 (Operation S52).

After beginning to monitor the control signal through the monitor 57, the reception controller 34 starts the monitor timer (Operation S53) and determines whether or not the control signal is received (Operation S54). When it is determined that the control signal is not received (No in Operation S54), the reception controller 34 determines whether or not the monitor timer is timed up (Operation S55). When it is determined that the monitor timer is timed up (Yes in Operation S55), the reception controller 34 determines that the signal disconnection lane of the transmitting device 2 has a failure, notifies the upper controller 15B of the failure (Operation S56), and ends the processing operation illustrated in FIG. 10.

When it is determined that the monitor timer is not timed up (No in Operation S55), the reception controller 34 proceeds to Operation S54 to determine whether or not the control signal is received. When it is determined that the control signal is received (Yes in Operation S54), the reception controller changes the use lane and adds the addition-targeted lane (Operation S57). Then, the reception controller 34 notifies the upper controller 15B of the addition completion (Operation S58) and ends the processing operation illustrated in FIG. 10. When it is determined that the use lane signal disconnection is not detected (No in Operation S51), the reception controller 34 ends the processing operation illustrated in FIG. 10.

The receiving device 3 performing the reception side lane adding processing operation illustrated in FIG. 10 begins to monitor the control signal through the monitor 57 after detecting the signal disconnection. As a result, the receiving device 3 needs not monitor the control signal at all times and can monitor the control signal efficiently, thereby reducing a processing load and power consumption.

After beginning to monitor the control signal related to the lane addition request, the receiving device 3 determines whether or not the control signal is received within the timer time. When it is determined that the control signal is received within the timer time, the receiving device 3 adds the use lane based on the control signal. As a result, the receiving device 3 can add the use lane based on the control signal.

When it is determined that the control signal is not received within the timer time, the receiving device 3 determines that the signal lane has a failure. As a result, the receiving device 3 can recognize the failure of the signal lane.

Figure 11A:
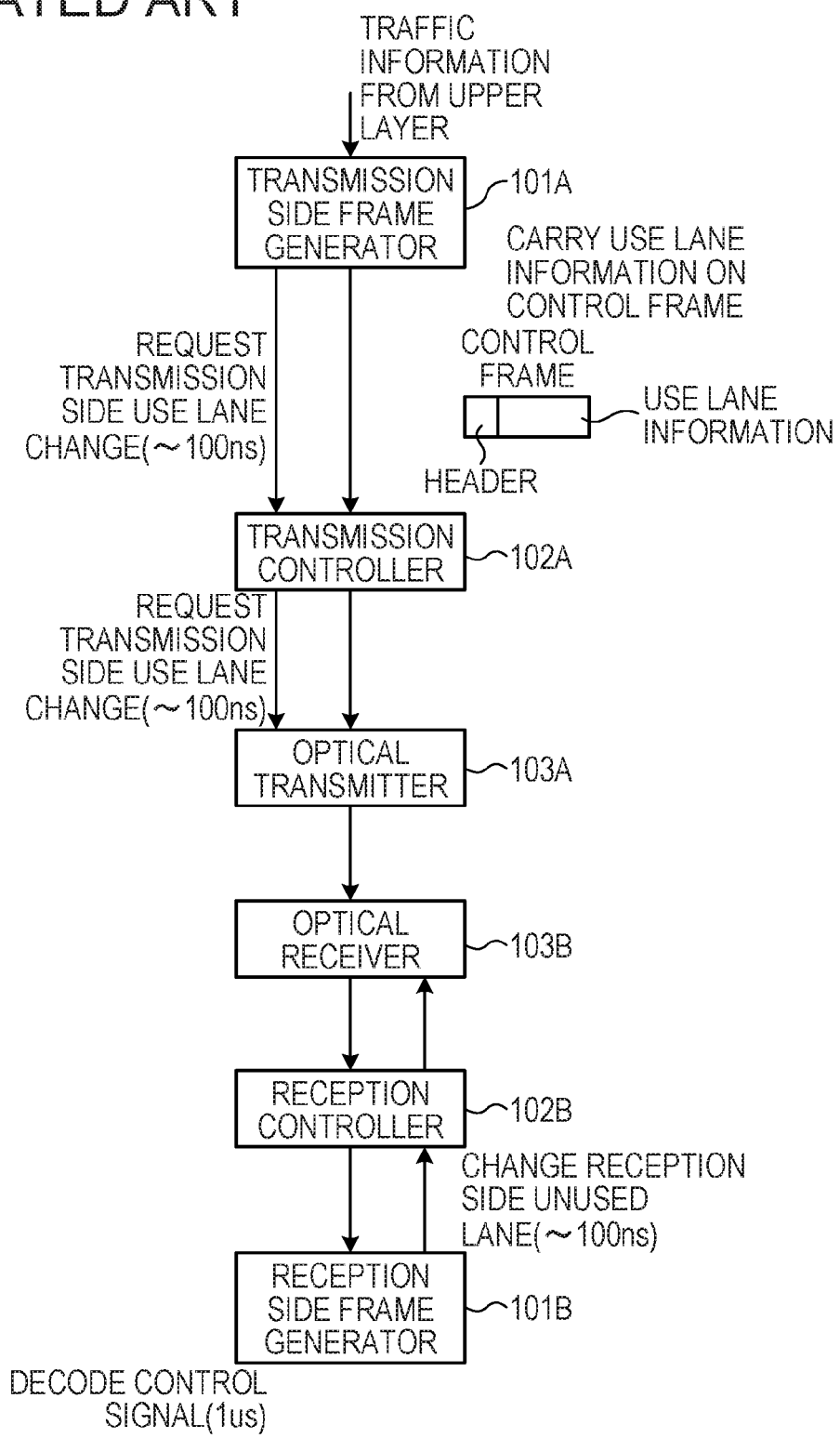
FIG. 11A is an explanatory view illustrating one example of a conventional control signal transmitting method.
Figure 11B:
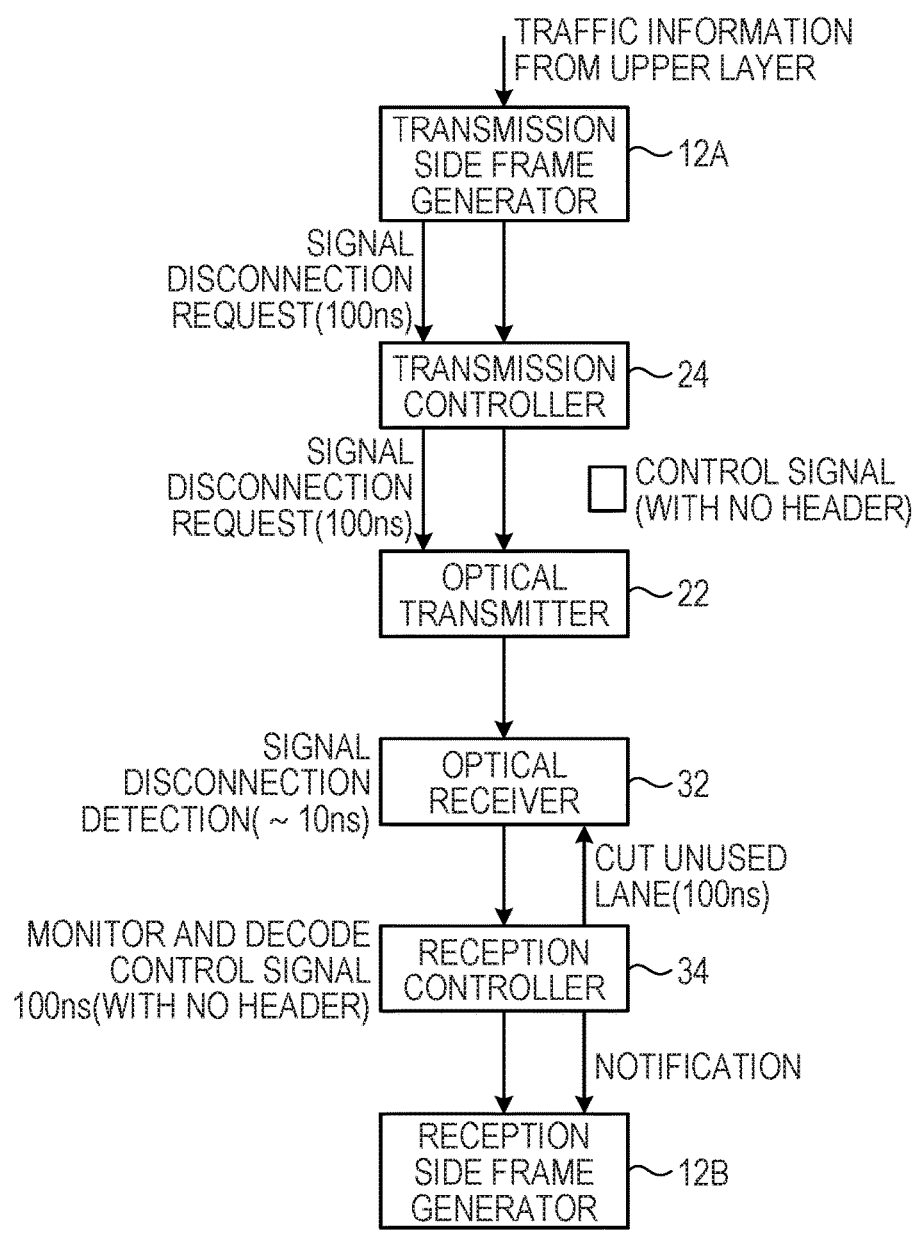
FIG. 11B is an explanatory view illustrating one example of a control signal transmitting method according to the present embodiment.

FIG. 11A is an explanatory view illustrating one example of a conventional control signal transmitting method, and FIG. 11B is an explanatory view illustrating one example of a control signal transmitting method according to the present embodiment. When transmitting a control signal of a lane change to a receiving device, a transmission side frame generating layer 101A in a transmitting device illustrated in FIG. 11A notifies a transmission controller 102A in a transmission side physical layer of a use lane change. In addition, the transmission controller 102A notifies an optical transmitter 103A of the use lane change.

In addition, the transmission side frame generating layer 101A loads use lane information of the lane change on the control signal and adds a header to the control signal. Then, the transmission side frame generating layer 101A transmits the control signal to the transmission controller 102A. The transmission controller 102A transmits the control signal to the optical transmitter 103A. The optical transmitter 103A transmits the control signal to the receiving device via an optical cable.

An optical receiver 103B in the receiving device receives the control signal via the optical cable. In addition, the optical receiver 103B transmits the received control signal to a reception controller 102B. The reception controller 102B transmits the received control signal to a reception side frame generating layer 101B. The reception side frame generating layer 101B analyzes the header of a received signal and identifies the received signal from the control signal based on the analyzed header. In addition, the reception side frame generating layer 101B decodes the control signal to identify the use lane information in the control signal. It takes 1 μs for the reception side frame generating layer 101B to identify the use lane information in the control signal after the header of the control signal is analyzed. The reception side frame generating layer 101B notifies the reception controller 102B of a use lane change request based on the use lane information. The reception controller 102B controls the optical receiver 103B according to the use lane change request. Based on the use lane information, it takes 100 ns for the reception side frame generating layer 101B to notify the reception controller 102B of the use lane change request of the reception side, and it takes 100 ns for the reception controller 102B to notify the optical receiver 103B of the use lane change request of the reception side.

That is, in the control signal transmitting method illustrated in FIG. 11A, the transmission side frame generating layer 101A adds a header to the control signal, and the reception side frame generating layer 101B identifies the control signal based on the header and decodes the control signal. Then, based on the decoded use lane information, the reception controller 102B notifies the optical receiver 103B of the use lane change.

In contrast, a transmission side frame generating layer 12A in the transmitting device 2 illustrated in FIG. 11B notifies the transmission controller 24 of a signal disconnection request when transmitting a control signal of lane change to the receiving device 3. Upon detecting the signal disconnection request, the transmission controller 24 controls the optical transmitter 22 to disconnect a signal of a signal disconnection-targeted lane. In addition, the transmission controller 24 transmits a control signal including use lane information of lane change generated in the generator 47 to the optical transmitter 22 of the signal disconnection lane. The optical transmitter 22 transmits the control signal to the receiving device 3 via the optical cable 4.

Upon detecting signal disconnection of a lane, the optical receiver 32 in the receiving device 3 notifies the reception controller 34 of the signal disconnection. Upon detecting the signal disconnection, the reception controller 34 begins to monitor the control signal of the signal disconnection lane. The time taken for the detection of signal disconnection is about 10 ns. The optical receiver 32 in the receiving device 3 receives the control signal from the optical cable 4 and transmits the control signal to the reception controller 34. Since the reception controller 34 is monitoring the control signal, based on the use lane information in the control signal, the reception controller 34 controls the optical receiver 32 to change the use lane and notifies the reception side frame generating layer 12B of the use lane change completion. Since there is no need to analyze the header, it takes, for example, about 100 ns for the reception controller 34 to decode the use lane information from the control signal. Therefore, in the control signal transmitting method illustrated in FIG. 11B, since the transmitting device 2 needs not add a header to the control signal, the reception controller 34 decodes the control signal and then notifies the optical receiver 32 of the use lane change based on the use lane information in the control signal.

That is, in the first embodiment, since the transmission controller 24 generates the control signal and transmits the control signal to the lane of signal disconnection without a need for the transmission side frame generating layer 12A to generate the control signal and add the header, it is possible to reduce a transmission side processing load required for transmission of the control signal.

In addition, in the first embodiment, instead of decoding the control signal in the reception side frame generating layer 12B, since the reception controller 34 can decode the control signal at a high speed, it is possible to reduce the reception side processing load required for transmission of the control signal.

The receiving device 3 of the first embodiment begins to monitor the control signal through the monitor 57 upon detecting the signal disconnection. That is, even when the header is not added to the control signal, the reception controller 34 can recognize a signal received within the timer time Tc as the control signal. As a result, since there is no need to monitor all received signals, the reception controller 34 can monitor the control signal efficiently, thereby reducing a processing load required for the monitoring and power consumption. In addition, the reception controller 34 can change the number of lanes at a high speed. In addition, when the control signal is not received even after the timer time Tc elapses, the reception controller 34 determines that there is a lane failure.

The receiving device 3 begins to count the monitor timer when the signal disconnection is detected, and performs a processing operation based on the control signal when the control signal is received until the timer time Tc of the monitor timer elapses. As a result, without monitoring the control signal at all times, the receiving device 3 only monitors the control signal until the timer time Tc elapses, thereby reducing the processing load and power consumption.

When the control signal is not received until the timer time Tc of the monitor timer elapses, the receiving device 3 determines that there is a lane failure in the optical cable 4 connected to the transmitting device 2. As a result, when the control signal is not received even after the timer time Tc elapses, the receiving device 3 determines that the signal disconnection is unintentional and accordingly may determine that there is a lane failure.

The receiving device 3 receives a signal coded in the coder 41 in the transmitting device 2 and receives the control signal in the monitor 57 before decoding the received signal in the decoder 56. As a result, since the receiving device 3 can monitor the control signal before decoding the control signal, it is possible to reduce the processing load required for the decoding of the monitored control signal and power consumption.

The optical transmission system 1 is useful for a data center where a traffic amount varies and can adjust the number of use lanes at a high speed when the traffic amount varies.

The optical transmission system 1 of the first embodiment illustratively includes the transmitting device 2 and the receiving device 3, and the receiving device 3 begins to monitor the control signal after detecting the lane signal disconnection with the transmitting device 2. In general, since a transmission apparatus includes the transmitting device 2 and the receiving device 3, an embodiment of an optical transmission system transmitting a control signal between transmission apparatuses, each of which includes the transmitting device 2 and the receiving device 3, will be described below as a second embodiment.

Second Embodiment

Figure 12A:
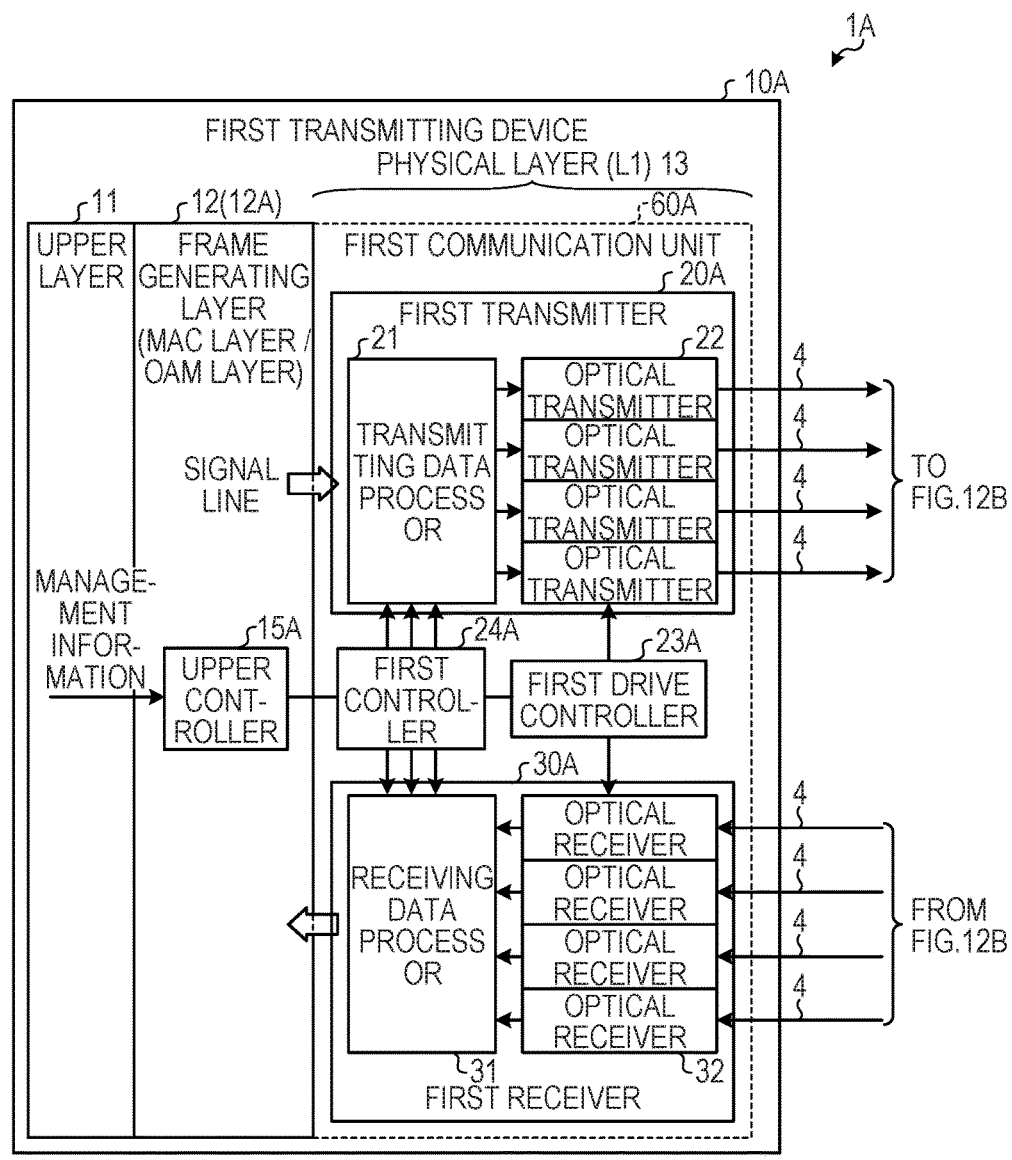
FIGS. 12A and 12B are an explanatory view illustrating one example of an optical transmission system according to a second embodiment.
Figure 12B:
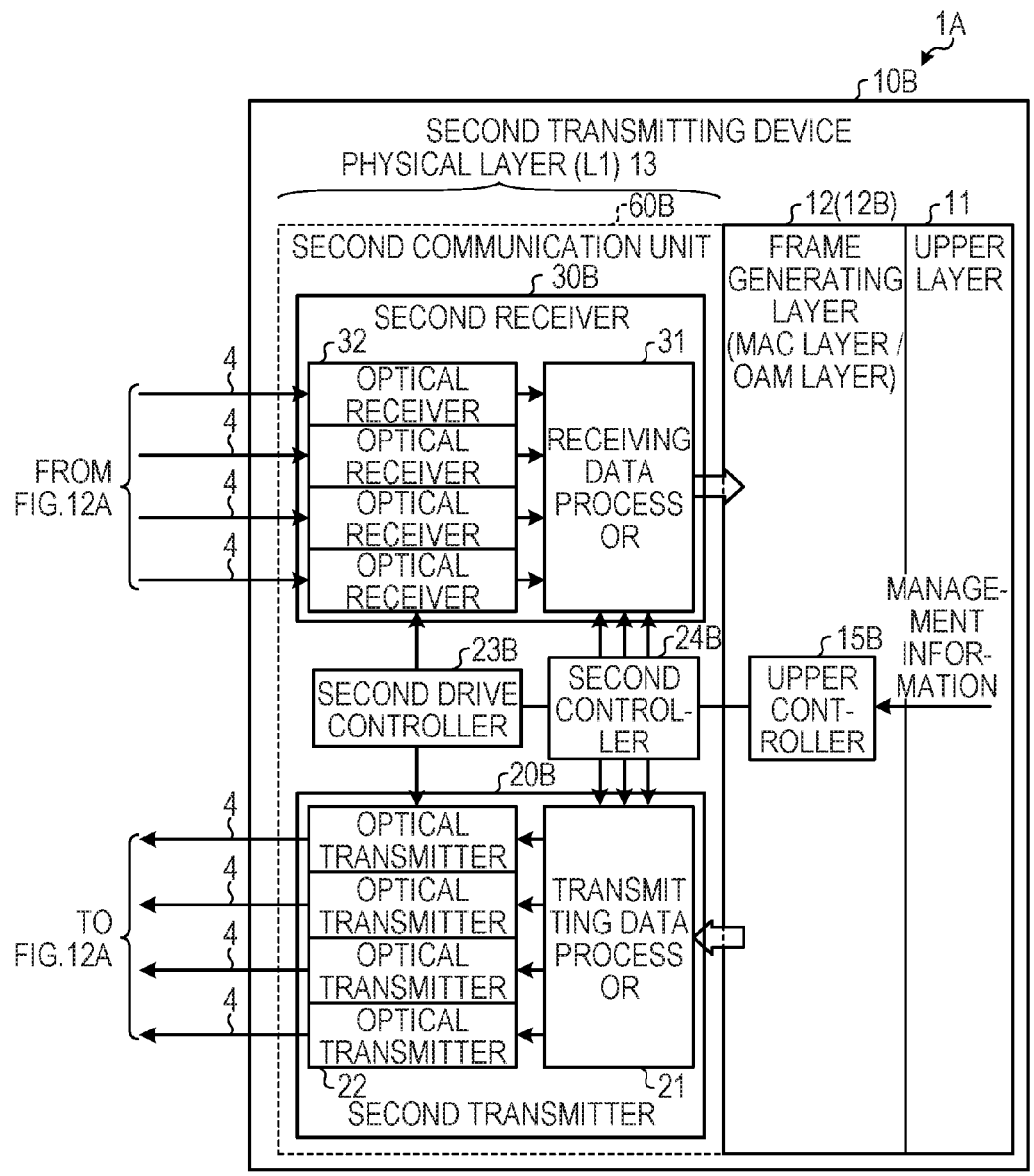

FIGS. 12A and 12B are an explanatory view illustrating one example of an optical transmission system 1A according to a second embodiment. In FIGS. 12A and 12B, the same elements as those of the optical transmission system 1 of the first embodiment will be denoted by the same reference numerals as used for the optical transmission system 1, and explanation of overlapping configurations and operations thereof will be omitted.

An optical transmission system 1A illustrated in FIGS. 12A and 12B includes a first transmitting device 10A and a second transmitting device 10B and interconnects the first transmitting device 10A and the second transmitting device 10B by an optical cable 4 so as to exchange a signal between the first transmitting device 10A and the second transmitting device 10B.

A physical layer 13 of the first transmitting device 10A includes a first communication unit 60A. The first communication unit 60A includes a first transmitter 20A, a first receiver 30A, a first drive controller 23A, and a first controller 24A. The first transmitter 20A includes a transmitting data processor 21 and a plurality of optical transmitters 22. The first receiver 30A includes a plurality of optical receivers 32 and a receiving data processor 31. The first drive controller 23A controls the first transmitter 20A and the first receiver 30A. The first controller 24A controls the entire first transmitting device 10A.

The first drive controller 23A controls a driver 22A to adjust the signal strength of an optical signal output from a light emitting element 22B. Upon detecting a signal disconnection request from the first communication controller 24A, the first drive controller 23A controls the driver 22A to disconnect the optical signal from the light emitting element 22B. As a result, the light emitting element 22B disconnects an output signal.

A physical layer 13 of the second transmitting device 10B includes a second communication unit 60B. The second communication unit 60B includes a second transmitter 20B, a second receiver 30B, a second drive controller 23B, and a second controller 24B. The second transmitter 20B includes a transmitting data processor 21 and a plurality of optical transmitters 22. The second receiver 30B includes a plurality of optical receivers 32 and a receiving data processor 31. The second drive controller 23B controls the second transmitter 20B and the second receiver 30B. The second controller 24B controls the entire second transmitting device 10B.

The second drive controller 23B drives and controls a TIA 32B, monitors a voltage value of the TIA 32B, and detects signal disconnection based on the monitored voltage value. The second drive controller 23B is, for example, a controller which monitors whether or not the voltage value (signal strength) of the TIA 32B is equal to or lower than a predetermined threshold, and determines that a signal is disconnected when the voltage value is equal to or lower than the predetermined threshold. The second drive controller 23B notifies the second controller 24B of a result of the determination of the TIA 32B. The second controller 24B identifies signal disconnection of each lane based on the result of the determination of the TIA 32B.

Upon detecting a lane reduction request or a lane addition request from the upper controller 15A, the first controller 24A disconnects a signal. When the signal is disconnected, the first controller 24A starts timer time Ta of a first standby timer. Then, the first controller 24A begins to transmit a control signal when the first standby timer is timed up. In addition, the first controller 24A starts timer time Tb of a second standby timer from the beginning of transmission of the control signal. The second controller 24B brings the detection state of signal disconnection into a high level at a detection timing T1 of signal disconnection. In addition, the second controller 24B switches the output selector 52 of a lane of signal disconnection to the monitor 57 at the detection timing T1 of signal disconnection, starts the timer time Tc of the monitor timer of the monitor 57, and determines whether or not the timer time Tc is timed up. The monitor 57 monitors the control signal until the timer time Tc is timed up. The timer time Tc corresponds to the time for which the first transmitting device 10A begins to transmit the control signal from the signal disconnection until the second transmitting device 10B can sufficiently receive the control signal.

The second controller 24B begins to monitor the control signal at the detection timing T1 of signal disconnection through the monitor 57. That is, since there is no need for the second controller 24B to monitor the control signal at all times, a processing load required for the monitoring and power consumption can be reduced. In addition, even when no header is added to the control signal, the second controller 24B can recognize a signal received within the timer time Tc as a control signal. In addition, when the control signal is not received even after the timer time Tc elapses, the second controller 24B determines that there occurs a lane failure.

Among the lanes in the optical cable 4 between the first transmitting device 10A and the second transmitting device 10B, a lane from the first transmitter 20A to the second receiver 30B is assumed as an up-lane and a lane from the second transmitter 20B to the first receiver 30A is assumed as a down-lane.

Next, the operation of the optical transmission system 1B of the second embodiment will be described. FIG. 13 is a flow chart illustrating one example of a lane reducing process of the first controller 24A in the first transmitting device 10A. Referring to FIG. 13, the first controller 24A determines whether or not a lane reduction request from the upper controller 15A is detected (Operation S61). When it is determined that the lane reduction request is detected (Yes in Operation S61), the first controller 24A changes an up-lane that is in use based on the lane reduction request (Operation S62). The first controller 24A disconnects a signal disconnection-targeted lane among the use lanes (Operation S63). As a result, since the second transmitting device 10B is monitoring a reception state of each use lane, the second transmitting device 10B detects signal disconnection of a signal disconnection-targeted lane.

After the lane signal disconnection of the signal disconnection-targeted lane, the first controller 24A starts the first standby timer (Operation S64) and determines whether or not the first standby timer is timed up (Operation S65). It is assumed that the first standby timer sets time for which the signal disconnection is detected in the second transmitting device 10B from the beginning of the signal disconnection, as the timer time Ta.

When it is determined that the first standby timer is timed up (Yes in Operation S65), the first controller 24A transmits the control signal to the signal disconnection lane (Operation S66). In addition, the first controller 24A controls the input selector 45 to interconnect the optical transmitter 22 of the signal disconnection lane and the generator 47. The generator 47 generates a control signal including a number identifying a use lane related to a lane reduction request and a use lane to be reduced.

After transmitting the control signal, the first controller 24A starts the second standby timer (Operation S67) and determines whether or not the second standby timer is timed up (Operation S68). It is assumed that the second standby timer sets time for which the control signal is received in the second transmitting device 10B from the beginning of the control signal transmission, as the timer time Tb.

When it is determined that the second standby timer is timed up (Yes in Operation S68), the first controller 24A controls the crossbar switch 43 to cut the up-lane to be reduced (Operation S69). The cutting of the up-lane to be reduced refers to making an active reduction-targeted up-lane to be inactive.

After cutting the reduction-targeted up-lane, the first controller 24A determines whether or not a signal disconnection of a down-lane in use between the first controller 24A and the second transmitting device 10B is detected (Operation S70). In addition, the first controller 24A monitors a reception state of a use lane at all times and determines that a signal of the use lane is disconnected when the signal strength of the signal is equal to or lower than a predetermined threshold. When it is determined that the signal disconnection of a down-lane in use is detected (Yes in Operation S70), the first controller 24A begins to monitor the control signal from the second transmitter 20B in the second transmitting device 10B through the monitor 57 (Operation S71). That is, since the first controller 24A switches the output selector 52 corresponding to the signal disconnection lane to the monitor 57, the first controller 24A begins to monitor the control signal through the monitor 57.

After beginning to monitor the control signal through the monitor 57, the first controller 24A starts the monitor timer (Operation S72) and determines whether or not the control signal is received (Operation S73). When it is determined that the control signal is received (Yes in Operation S73), the first controller 24A controls the crossbar switch 54 to change a down-lane in use and cut a down-lane to be reduced (Operation S74). Then, the first controller 24A notifies the upper controller 15A of the reduction completion (Operation S75) and ends the processing operation illustrated in FIG. 13.

When it is determined that the control signal is not received (No in Operation S73), the first controller 24A determines whether or not the monitor timer is timed up (Operation S76). When it is determined that the monitor timer is timed up (Yes in Operation S76), the first controller 24A determines that the down-lane between the first controller 24A and the second transmitting device 10B has a failure, notifies the upper controller 15A of the failure (Operation S77), and ends the processing operation illustrated in FIG. 13.

When it is determined that the lane reduction request is not detected (No in Operation S61), the first controller 24A ends the processing operation illustrated in FIG. 13. When it is determined that the first standby timer is not timed up (No in Operation S65), the first controller 24A proceeds to Operation S65 to determine whether or not the first standby timer is timed up. When it is determined that the second standby timer is not timed up (No in Operation S68), the first controller 24A proceeds to Operation S68 to determine whether or not the second standby timer is timed up. When it is determined that the signal disconnection of the down-lane between the first controller 24A and the second transmitting device 10B is not detected (No in Operation S70), the first controller 24A proceeds to Operation S70. When it is determined that the monitor timer is not timed up (No in Operation S76), the first controller 24A proceeds to Operation S73 to determine whether or not the control signal is received.

The first transmitting device 10A disconnects the signal of the up-lane in use according to the lane reduction request and transmits the control signal related to the lane reduction request to the second transmitting device 10B after the timing-up of the first standby timer. After transmitting the control signal, the first transmitting device 10A cuts the reduction-targeted lane after the timing-up of the second standby timer. As a result, the first transmitting device 10A can notify the second transmitting device 10B of the reduction-targeted lane with the control signal and cut the reduction-targeted lane. In addition, the first transmitting device 10A can reduce the processing load required for the control signal transmission.

After detecting the signal disconnection, the first transmitting device 10A begins to monitor the control signal through the monitor 57. After beginning to monitor the control signal related to the lane reduction request, the first transmitting device 10A determines whether or not the control signal is received within the timer time. When the control signal is received within the timer time, the first transmitting device 10A reduces the number of use lanes based on the control signal. As a result, since the first transmitting device 10A begins to monitor the control signal after the detection of signal disconnection, the first transmitting device 10A can monitor the control signal efficiently. In addition, the first transmitting device 10A can reduce the number of use lanes based on the control signal. That is, upon detecting the lane reduction request, the first transmitting device 10A can cut the up-lane and down-lane to be reduced.

Figure 14:
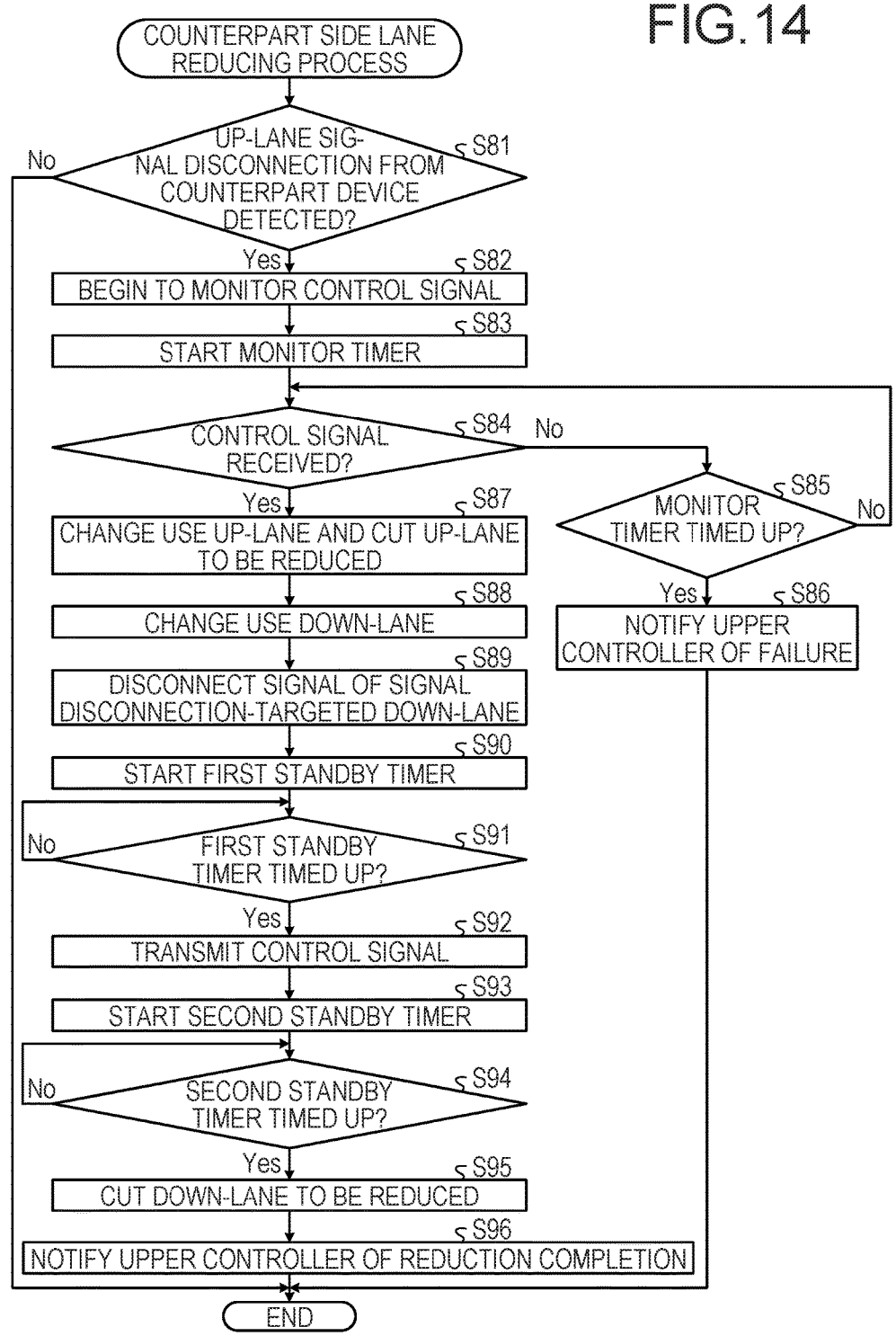
FIG. 14 is a flow chart illustrating one example of a processing operation of a second controller in a second transmitting device regarding a lane reducing process of an opposite side.

FIG. 14 is a flow chart illustrating one example of the processing operation of the second controller 24B in the second transmitting device 10B regarding a lane reducing process of the opposing side. Referring to FIG. 14, the second controller 24B determines whether or not signal disconnection of an up-lane between the second controller 24B and the first transmitting device 10A is detected (Operation S81). When it is determined that the up-lane signal disconnection is detected (Yes in Operation S81), the second controller 24B begins to monitor the control signal from the first transmitter 20A in the first transmitting device 10A through the monitor 57 (Operation S82).

After beginning to monitor the control signal, the second controller 24B starts the monitor timer (Operation S83) and determines whether or not the control signal is received from the first transmitting device 10A (Operation S84). When it is determined that the control signal is not received (No in Operation S84), the second controller 24B determines whether or not the monitor timer is timed up (Operation S85). When it is determined that the monitor timer is timed up (Yes in Operation S85), the second controller 24B determines that the up-lane between the second controller 24B and the first transmitting device 10A has a failure, notifies the upper controller 15B of the failure (Operation S86), and ends the processing operation illustrated in FIG. 14. When it is determined that the control signal is received (Yes in Operation S84), the second controller 24B changes an up-lane in use and cuts an up-lane to be reduced (Operation S87).

The second controller 24B changes a down-lane in use (Operation S88) and disconnects a signal of a signal disconnection-targeted down-lane (Operation S89). As a result, since the first transmitting device 10A is monitoring a reception state of each down-lane in use, the first transmitting device 10A detects signal disconnection of a down-lane.

After the use lane signal disconnection, the second controller 24B starts the first standby timer (Operation S90) and determines whether or not the first standby timer is timed up (Operation S91). It is assumed that the first standby timer sets time for which the signal disconnection is detected in the first transmitting device 10A from the beginning of the signal disconnection, as the timer time Ta.

When it is determined that the first standby timer is timed up (Yes in Operation S91), the second controller 24B transmits the control signal to the signal disconnection lane for the first transmitting device 10A (Operation S92). In addition, the second controller 24B controls the input selector 45 to interconnect the optical transmitter 22 of the signal disconnection-targeted lane and the generator 47. The generator 47 generates a control signal including a number identifying a use lane related to a lane reduction request and a use lane to be reduced.

After transmitting the control signal, the second controller 24B starts the second standby timer (Operation S93) and determines whether or not the second standby timer is timed up (Operation S94). It is assumed that the second standby timer sets time for which the control signal is received in the first transmitting device 10A from the beginning of the control signal transmission, as the timer time Tb.

When it is determined that the second standby timer is timed up (Yes in Operation S94), the second controller 24B controls the crossbar switch 43 to cut the down-lane to be reduced (Operation S95). The cutting of the down-lane to be reduced refers to making an active reduction-targeted down-lane to be inactive. After cutting the down-lane to be reduced, the second controller 24B notifies the upper controller 15B of the reduction completion (Operation S96) and ends the processing operation illustrated in FIG. 14.

When it is determined that the signal disconnection of an up-lane between the second controller 24B and the first transmitting device 10A is not detected (No in Operation S81), the second controller 24B ends the processing operation illustrated in FIG. 14. When it is determined that the first standby timer is not timed up (No in Operation S91), the second controller 24B proceeds to Operation S91 to determine whether or not the first standby timer is timed up. When it is determined that the second standby timer is not timed up (No in Operation S94), the second controller 24B proceeds to Operation S94 to determine whether or not the second standby timer is timed up. When it is determined that the monitor timer is not timed up (No in Operation S85), the second controller 24B proceeds to Operation S84 to determine whether or not the control signal is received.

After detecting the signal disconnection, the second transmitting device 10B begins to monitor the control signal of the up-lane through the monitor 57. After beginning to monitor the control signal, the second transmitting device 10B determines whether or not the control signal is received within the timer time. When it is determined that the control signal related to the lane reduction request is received within the timer time, the second transmitting device 10B reduces the number of up-lanes based on the control signal. As a result, since the second transmitting device 10B begins to monitor the control signal after the detection of signal disconnection, the second transmitting device 10B can monitor the control signal efficiently. In addition, the second transmitting device 10B can reduce the number of use lanes based on the control signal.

After cutting the up-lane, the second transmitting device 10B disconnects a signal of the down-lane in use and transmits the control signal to the first transmitting device 10A after the timing-up of the first standby timer. After transmitting the control signal, the second transmitting device 10B cuts the reduction-targeted down-lane after the timing-up of the second standby timer. As a result, the second transmitting device 10B can notify the first transmitting device 10A of the control signal related to the lane reduction request of the down-lane and cut the reduction-targeted down-lane. In addition, the second transmitting device 10B can reduce the processing load required for the control signal transmission and power consumption.

Figure 15:
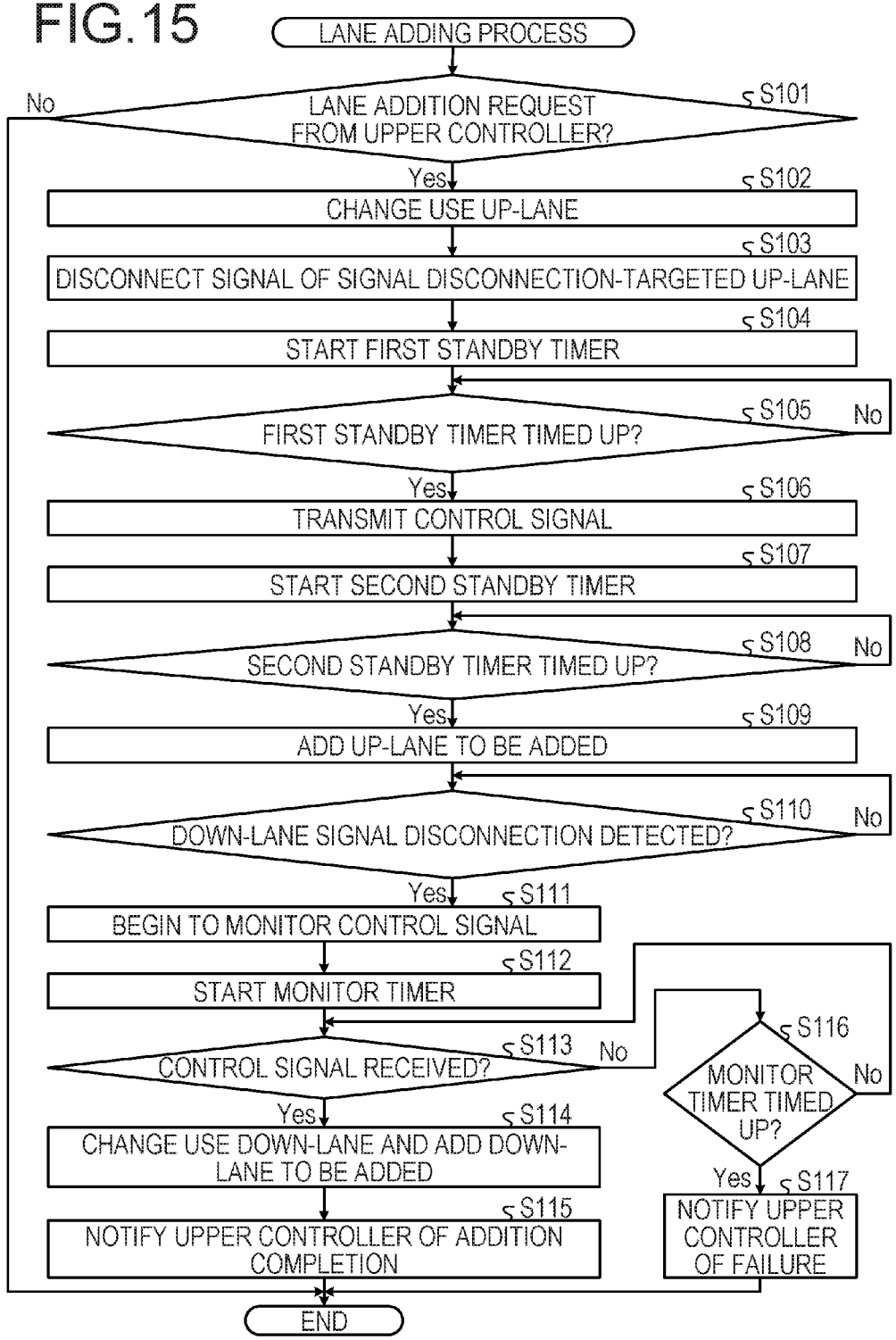
FIG. 15 is a flow chart illustrating one example of a processing operation of the first controller in the first transmitting device regarding a lane adding process.

FIG. 15 is a flow chart illustrating one example of a processing operation of the first controller 24A in the first transmitting device 10A regarding a lane adding process. Referring to FIG. 15, the first controller 24A determines whether or not a lane addition request from the upper controller 15A is detected (Operation S101). When it is determined that the lane addition request is detected (Yes in Operation S101), the first controller 24A changes an up-lane in use (Operation S102). The first controller 24A disconnects a signal disconnection-targeted up-lane of use lanes (Operation S103). As a result, since the second transmitting device 10B is monitoring a reception state of each use lane, the second transmitting device 10B detects signal disconnection of a signal disconnection-targeted lane.

After the signal disconnection of the signal disconnection-targeted lane, the first controller 24A starts the first standby timer (Operation S104) and determines whether or not the first standby timer is timed up (Operation S105). It is here assumed that the first standby timer sets time for which the signal disconnection is detected in the second transmitting device 10B from the beginning of the signal disconnection, as the timer time Ta.

When it is determined that the first standby timer is timed up (Yes in Operation S105), the first controller 24A transmits the control signal to the signal disconnection lane (Operation S106). In addition, the first controller 24A controls the input selector 45 to interconnect the optical transmitter 22 of the signal disconnection lane and the generator 47. The generator 47 generates a control signal including a number identifying a use lane related to a lane addition request and a use lane to be added.

After transmitting the control signal, the first controller 24A starts the second standby timer (Operation S107) and determines whether or not the second standby timer is timed up (Operation S108). It is assumed that the second standby timer sets time for which the control signal is received in the second transmitting device 10B from the beginning of the control signal transmission, as the timer time Tb.

When it is determined that the second standby timer is timed up (Yes in Operation S108), the first controller 24A controls the crossbar switch 43 to add an up-lane to be added (Operation S109). The adding of the up-lane to be added refers to making an inactive unused addition-targeted up-lane to be active.

After adding the addition-targeted up-lane, the first controller 24A determines whether or not signal disconnection of a down-lane between the first controller 24A and the second transmitting device 10B is detected (Operation S110). When it is determined that the signal disconnection of the down-lane is detected (Yes in Operation S110), the first controller 24A begins to monitor the control signal from the second transmitter 20B in the second transmitting device 10B through the monitor 57 (Operation S111).

After beginning to monitor the control signal, the first controller 24A starts the monitor timer (Operation S112) and determines whether or not the control signal is received (Operation S113). When it is determined that the control signal is received (Yes in Operation S113), the first controller 24A changes a down-lane in use and adds a down-lane to be added (Operation S114). Then, the first controller 24A notifies the upper controller 15A of the addition completion (Operation S115) and ends the processing operation illustrated in FIG. 15.

When it is determined that the control signal is not received (No in Operation S113), the first controller 24A determines whether or not the monitor timer is timed up (Operation S116). When it is determined that the monitor timer is timed up (Yes in Operation S116), the first controller 24A determines that the down-lane between the first controller 24A and the second transmitting device 10B has a failure, notifies the upper controller 15A of the failure (Operation S117), and ends the processing operation illustrated in FIG. 16.

When it is determined that the lane addition request is not detected (No in Operation S101), the first controller 24A ends the processing operation illustrated in FIG. 15. When it is determined that the first standby timer is not timed up (No in Operation S105), the first controller 24A proceeds to Operation S105 to determine whether or not the first standby timer is timed up. When it is determined that the second standby timer is not timed up (No in Operation S108), the first controller 24A proceeds to Operation S108 to determine whether or not the second standby timer is timed up. When it is determined that the signal disconnection of the down-lane between the first controller 24A and the second transmitting device 10B is not detected (No in Operation S110), the first controller 24A proceeds to Operation S110. When it is determined that the monitor timer is not timed up (No in Operation S116), the first controller 24A proceeds to Operation S113 to determine whether or not the control signal is received.

The first transmitting device 10A disconnects a signal of the up-lane in use according to the lane addition request and transmits the control signal related to the lane addition request to the second transmitting device 10B after the timing-up of the first standby timer. After transmitting the control signal, the first transmitting device 10A adds the addition-targeted lane after the timing-up of the second standby timer. As a result, the first transmitting device 10A can notify the second transmitting device 10B of the addition-targeted lane with the control signal and add the addition-targeted lane. In addition, the first transmitting device 10A can reduce the processing load required for the control signal transmission.

After detecting the signal disconnection, the first transmitting device 10A begins to monitor the control signal through the monitor 57. After beginning to monitor the control signal related to the lane addition request, the first transmitting device 10A determines whether or not the control signal is received within the timer time. When it is determined that the control signal is received within the timer time, the first transmitting device 10A adds the number of use lanes based on the control signal. As a result, since the first transmitting device 10A begins to monitor the control signal after the detection of signal disconnection, the first transmitting device 10A can monitor the control signal efficiently. In addition, the first transmitting device 10A can add the number of use lanes based on the control signal. That is, upon detecting the lane addition request, the first transmitting device 10A can add the up-lane and down-lane to be added.

Figure 16:
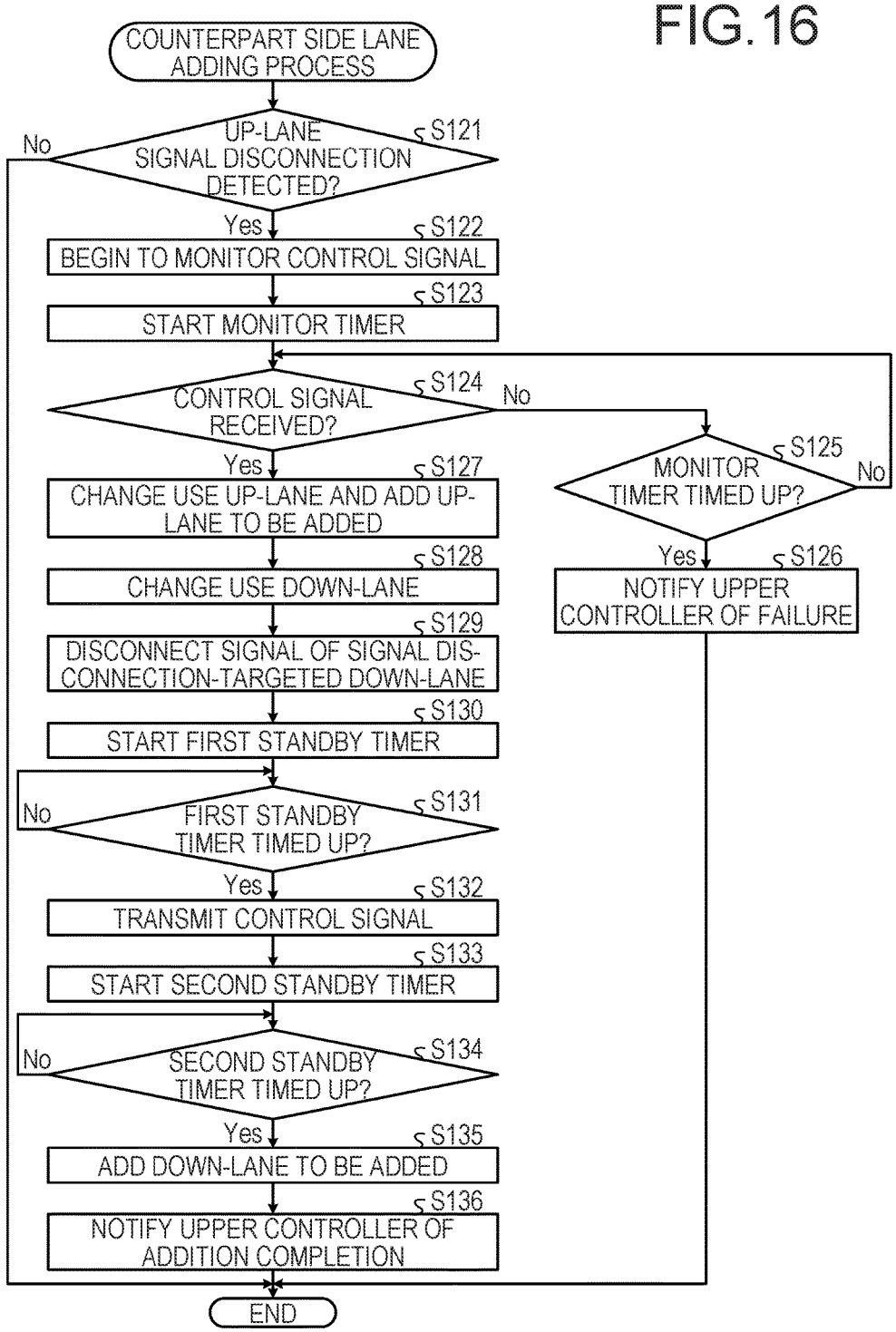
FIG. 16 is a flow chart illustrating one example of a processing operation of the second controller in the second transmitting device regarding a lane adding process of an opposite side.

FIG. 16 is a flow chart illustrating one example of the processing operation of the second controller 24B in the second transmitting device 10B regarding a lane adding process of the opposing side. Referring to FIG. 16, the second controller 24B determines whether or not signal disconnection of an up-lane between the second controller 24B and the first transmitting device 10A is detected (Operation S121). When it is determined that the up-lane signal disconnection is detected (Yes in Operation S121), the second controller 24B begins to monitor the control signal from the first transmitter 20A in the first transmitting device 10A through the monitor 57 (Operation S122).

After beginning to monitor the control signal, the second controller 24B starts the monitor timer (Operation S123) and determines whether or not the control signal is received from the first transmitting device 10A (Operation S124). When it is determined that the control signal is not received (No in Operation S124), the second controller 24B determines whether or not the monitor timer is timed up (Operation S125). When it is determined that the monitor timer is timed up (Yes in Operation S125), the second controller 24B determines that the up-lane between the second controller 24B and the first transmitting device 10A has a failure, notifies the upper controller 15B of the failure (Operation S126), and ends the processing operation illustrated in FIG. 16. When it is determined that the control signal is received (Yes in Operation S124), the second controller 24B changes an up-lane in use and adds an up-lane to be added (Operation S127).

The second controller 24B changes a down-lane in use (Operation S128) and disconnects a signal of a signal disconnection-targeted down-lane (Operation S129). As a result, since the first transmitting device 10A is monitoring a reception state of each down-lane in use, the first transmitting device 10A detects signal disconnection of a down-lane.

After the down-lane signal disconnection, the second controller 24B starts the first standby timer (Operation S130) and determines whether or not the first standby timer is timed up (Operation S131). It is assumed that the first standby timer sets time for which the signal disconnection is detected in the first transmitting device 10A from the beginning of the signal disconnection, as the timer time Ta.

When it is determined that the first standby timer is timed up (Yes in Operation S131), the second controller 24B transmits the control signal to the signal disconnection lane for the first transmitting device 10A (Operation S132). In addition, the first controller 24A controls the input selector 45 to interconnect the optical transmitter 22 of the signal disconnection-targeted lane and the generator 47. The generator 47 generates a control signal including a number identifying a use lane related to a lane addition request and a use lane to be added.

After transmitting the control signal, the second controller 24B starts the second standby timer (Operation S133) and determines whether or not the second standby timer is timed up (Operation S134). It is assumed that the second standby timer sets time for which the control signal is received in the first transmitting device 10A from the beginning of the control signal transmission, as the timer time Tb.

When the second standby timer is timed up (Yes in Operation S134), the second controller 24B controls the crossbar switch 43 to add the down-lane to be added (Operation S135). The adding of the down-lane to be added refers to making an active addition-targeted down-lane to be inactive. After adding the down-lane to be added, the second controller 24B notifies the upper controller 15B of the addition completion (Operation S136) and ends the processing operation illustrated in FIG. 16.

After adding the down-lane, when it is determined that the signal disconnection of an up-lane between the second controller 24B and the first transmitting device 10A is not detected (No in Operation S121), the second controller 24B ends the processing operation illustrated in FIG. 16. When it is determined that the first standby timer is not timed up (No in Operation S131), the second controller 24B proceeds to Operation S131 to determine whether or not the first standby timer is timed up. When it is determined that the second standby timer is not timed up (No in Operation S134), the second controller 24B proceeds to Operation S134 to determine whether or not the second standby timer is timed up. When it is determined that the monitor timer is not timed up (No in Operation S125), the second controller 24B proceeds to Operation S124 to determine whether or not the control signal is received.

After detecting the signal disconnection, the second transmitting device 10B begins to monitor the control signal of the up-lane through the monitor 57. After beginning to monitor the control signal, the second transmitting device 10B determines whether or not the control signal is received within the timer time. When it is determined that the control signal related to the lane addition request is received within the timer time, the second transmitting device 10B adds the number of up-lanes based on the control signal. As a result, since the second transmitting device 10B begins to monitor reception of the control signal after the detection of signal disconnection, the second transmitting device 10B can monitor the control signal efficiently. In addition, the second transmitting device 10B can add the number of use lanes based on the control signal.

After cutting the up-lane, the second transmitting device 10B disconnects the signal of the down-lane in use and transmits the control signal to the first transmitting device 10A after the timing-up of the first standby timer. After transmitting the control signal, the second transmitting device 10B adds the addition-targeted down-lane after the timing-up of the second standby timer. As a result, the second transmitting device 10B can notify the first transmitting device 10A of the control signal related to the lane reduction request of the down-lane and add the addition-targeted down-lane. In addition, the second transmitting device 10B can reduce the processing load required for the control signal transmission and power consumption.

The first transmitting device 10A of the second embodiment begins to monitor the control signal through the monitor 57 upon detecting the signal disconnection. That is, even when the header is not added to the control signal, the first transmitting device 10A can recognize a signal received within the timer time Tc as the control signal. As a result, since there is no need to monitor all received signals, the first transmitting device 10A can monitor the control signal efficiently, thereby reducing the processing load required for the monitoring and power consumption. In addition, the first transmitting device 10A can change the number of lanes at a high speed. In addition, when the control signal is not received even after the timer time Tc elapses, the first transmitting device 10A determines that there is a lane failure.

The first transmitting device 10A begins to count the monitor timer when the signal disconnection is detected, and performs a processing operation based on the control signal when the control signal is received until the timer time Tc of the monitor timer elapses. As a result, the first transmitting device 10A merely monitors the control signal until the timer time Tc elapses without monitoring the control signal at all times, thereby reducing the processing load and power consumption.

When the control signal is not received until the timer time Tc of the monitor timer elapses, the first transmitting device 10A determines that there is a lane failure in the optical cable 4 connected to the transmitting device 2. As a result, when the control signal is not received even after the timer time Tc elapses, the first transmitting device 10A determines that the signal disconnection is unintentional and accordingly can determine that there is a lane failure.

The first transmitting device 10A receives a signal coded in the coder 41 in the second transmitting device 10B and receives the control signal in the monitor 57 before decoding the received signal in the decoder 56. As a result, since the first transmitting device 10A can monitor the control signal before decoding the control signal, it is possible to reduce the processing load required for the decoding of the monitored control signal and power consumption.

While the transmitting data processor 21 illustrated in FIG. 2 includes four of the first buffers 42 and four of the second buffers 44, the number of first and second buffers 42 and 44 may be appropriately changed. In addition, the first and second buffers 42 and 44 may be omitted.

While the receiving data processor 31 illustrated in FIG. 3 includes four of the third buffers 53 and four of the fourth buffers 55, the number of third and fourth buffers 53 and 55 may be appropriately changed. In addition, the third and fourth buffers 53 and 55 may be omitted.

Although it has been illustrated in the above embodiments that a signal disconnection-targeted lane among the lanes in use is notified from the upper controller 15A (15B) in order to transmit the control signal, this may be determined in the transmission controller 24 or the first controller 24A.

Although the number of signal disconnection-targeted lanes for transmission of the control signal is not particularly limited, it may be at least one or may be appropriately changed. Therefore, when the above embodiments are applied, there is a need to make at least one of the use lanes to be active.

In the second embodiment, the up-lanes and down-lanes used in the optical cable 4 between the first transmitting device 10A and the second transmitting device 10B have been set to have substantially the same transmission capacity, and the number thereof has been set to be the same. However, the number of the up-lanes used and the number of the down-lanes used may be appropriately changed without being limited to the same.

In addition, although it has been illustrated in the above embodiments that the use lane information is used as the control signal, the control signal may be communication protocol information, transmission rate information, setting information of a transceiver such as, for example, the optical transmitter 22 or the optical receiver 32, or may be appropriately changed.

In the transmitting device 2 and the receiving device 3, it may be assumed that the control signal is transmitted through a control line different from the optical cable 4. However, preparing an electrical control line different from the optical cable 4 will incur a cost. Moreover, since mixing the optical cable 4 and the electrical control line causes a difficulty in manufacture, it is desirable to transmit the control signal through the optical cable 4.

The elements of the respective illustrated parts may not be configured as physically illustrated. That is, concrete forms of distribution or integration of the respective parts are not limited to those illustrated, but all or some thereof may be functionally or physically distributed or integrated in an arbitrary unit, depending on various loads and use conditions.

A variety of processing functions performed in various devices may be entirely or partially performed on a CPU (Central Processing Unit), DSP (Digital Signal Processor) or FPGA (Field Programmable Gate Array). In addition, the variety of processing functions may be entirely or partially performed on a program analyzed and executed by a CPU or the like or on hardware by wired logics.

The areas storing a variety of information may be configured with a read only memory (ROM) or a random access memory (RAM) such as, for example, asynchronous dynamic random access memory (SDRAM), a magnetoresistive random access memory (MRAM), or a nonvolatile random access memory (NVRAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device comprising:
a receiver configured to receive a data signal including data information and a control signal including control information;
a monitor configured to monitor the control information included in the control signal received by the receiver; and
a controller configured to control the monitor to start monitoring the control information included in the control signal only when a strength of the data signal is equal to or lower than a predetermined value,
wherein when the strength of the data signal is equal to or lower than the predetermined value represents a time of signal disconnection of the data signal.

2. The receiving device according to claim 1, wherein, when the strength of the data signal is equal to or lower than the predetermined value, the controller starts a time counting of a timer, and when the control information is detected by a time set by the timer, the controller controls addition or reduction of use lanes based on the control information monitored by the monitor.

3. The receiving device according to claim 2, wherein, when the control information is not detected by the time set by the timer, the controller determines that a signal line connected with an opposing device transmitting the control information has a failure, and notifies an upper controller of information of the failure.

4. The receiving device according to claim 1,
wherein the receiver receives the data signal and the control signal through each of a plurality of lanes in a signal line connected to an opposing device transmitting the control information, and
wherein, when the strength of the data signal received through at least one of the plurality of lanes is equal to or lower than the predetermined value, the controller controls the monitor to start monitoring the control information included in the control signal through a lane having the strength of the signal equal to or lower than the predetermined value.

5. The receiving device according to claim 4, wherein the monitor receives the data signal coded by the opposing device and detects the control information included in the control signal before decoding the received data signal.

6. The receiving device according to claim 1, wherein the monitor monitors the control information included in the control signal detected after a predetermined time elapses after detecting the data signal having the strength equal to or lower than the predetermined value.

7. The receiving device according to claim 4, wherein, when at least one of the plurality of lanes between the receiving device and the opposing device is active, the controller determines whether or not the strength of the data signal of the active lane is equal to or lower than a predetermined value.

8. A method for monitoring control information in a receiving device, comprising:
receiving a data signal including data information and a control signal including control information;
determining whether or not a strength of the data signal received at the receiving by the receiving device is equal to or lower than a predetermined value; and
monitoring the control information included in the control signal only when the strength of the signal is equal to or lower than the predetermined value,
wherein when the strength of the data signal is equal to or lower than the predetermined value represents a time of signal disconnection of the data signal.

* * * * *